US012717554B2

(12) United States Patent
Glukhovsky et al.

(10) Patent No.: US 12,717,554 B2
(45) Date of Patent: Aug. 25, 2026

(54) UNIVERSAL DEVELOPER ENVIRONMENT FOR DEVELOPING AND MANAGING INTEGRATIONS FOR API PLATFORMS

(71) Applicant: Stripe, LLC, South San Francisco, CA (US)

(72) Inventors: Michael Glukhovsky, San Francisco, CA (US); Tomer Elmalem, San Francisco, CA (US); Karolis Kosas, San Francisco, CA (US); Owen Williams, San Francisco, CA (US); Zachary Padovani-Ginies, San Francisco, CA (US); Azalea Irani, San Francisco, CA (US)

(73) Assignee: Stripe, LLC, South San Francisco, CA (US)

( * ) Notice: Subject to any disclaimer, the term of this patent is extended or adjusted under 35 U.S.C. 154(b) by 662 days.

(21) Appl. No.: 18/142,524

(22) Filed: May 2, 2023

(65) Prior Publication Data

US 2024/0370232 A1 Nov. 7, 2024

(51) Int. Cl.

| | |
|---|---|
| ***G06F 9/44*** | (2018.01) |
| ***G06F 3/0481*** | (2022.01) |
| ***G06F 3/0484*** | (2022.01) |
| ***G06F 8/34*** | (2018.01) |

(52) U.S. Cl.

CPC .............. *G06F 8/34* (2013.01); *G06F 3/0481* (2013.01); *G06F 3/0484* (2013.01)

(58) Field of Classification Search

None

See application file for complete search history.

(56) References Cited

U.S. PATENT DOCUMENTS

| | | | | |
|---|---|---|---|---|
| 11,079,929 | B2 * | 8/2021 | Walkin | G06F 3/0481 |
| 11,119,906 | B1 * | 9/2021 | Edouard | G06Q 20/10 |
| 2006/0218563 | A1 * | 9/2006 | Grinstein | G06F 9/44521<br>719/328 |
| 2017/0357424 | A1 * | 12/2017 | Hess | G06F 9/451 |

FOREIGN PATENT DOCUMENTS

| | | | | |
|---|---|---|---|---|
| CN | 111880839 | * | 11/2020 | |
| CN | 113296757 A | * | 8/2021 | G06F 8/34 |
| CN | 114237594 A | * | 3/2022 | |
| CN | 107924411 B | * | 4/2023 | |

* cited by examiner

*Primary Examiner* — Insun Kang

(74) *Attorney, Agent, or Firm* — BAKERHOSTETLER

(57) ABSTRACT

This disclosure provides techniques for providing a context-aware tool that, in some examples, is globally available throughout a platform.

21 Claims, 17 Drawing Sheets

700

DISPLAY A DEVELOPMENT USER INTERFACE FROM A CLIENT USER INTERFACE — 702

RECEIVE AN INDICATION THAT A FIRST OBJECT FROM THE CLIENT USER INTERFACE IS IN A FIRST STATE, WHEREIN THE FIRST STATE IS ASSOCIATED WITH A USER CONFIGURATION — 704

IN RESPONSE TO RECEIVING THE INDICATION THAT THE FIRST OBJECT IS IN THE FIRST STATE, DISPLAY A FIRST REPRESENTATION OF THE FIRST OBJECT IN THE DEVELOPMENT USER INTERFACE — 706

WHILE DISPLAYING THE FIRST REPRESENTATION OF THE FIRST OBJECT IN THE DEVELOPMENT USER INTERFACE, DETECT A FIRST EVENT ASSOCIATED WITH A CHANGE IN THE USER CONFIGURATION — 708

IN RESPONSE TO DETECTING THE FIRST EVENT ASSOCIATED WITH THE CHANGE IN THE USER CONFIGURATION, DISPLAY:

AN UPDATED REPRESENTATION OF THE FIRST OBJECT IN THE DEVELOPMENT USER INTERFACE AND AN UPDATED; AND

AN UPDATED REPRESENTATION OF THE FIRST OBJECT IN THE CLIENT USER INTERFACE — 710

Figure 4E:
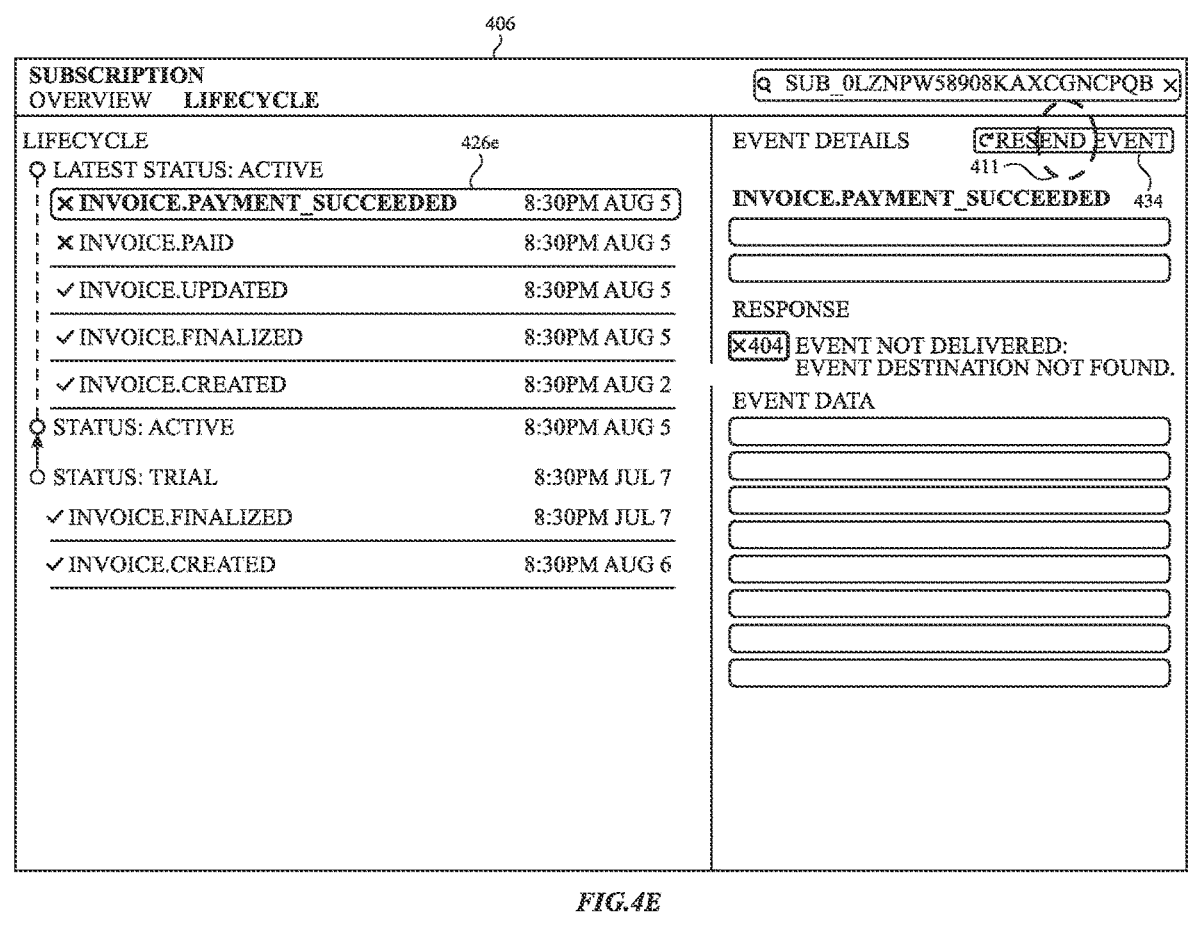

406

SUBSCRIPTION
OVERVIEW LIFECYCLE
SUB_0LZNPW58908KAXCGNCPQB

LIFECYCLE
LATEST STATUS: ACTIVE
426e
INVOICE.PAYMENT_SUCCEEDED 8:30PM AUG 5
INVOICE.PAID 8:30PM AUG 5
INVOICE.UPDATED 8:30PM AUG 5
INVOICE.FINALIZED 8:30PM AUG 5
INVOICE.CREATED 8:30PM AUG 2
STATUS: ACTIVE 8:30PM AUG 5
STATUS: TRIAL 8:30PM JUL 7
INVOICE.FINALIZED 8:30PM JUL 7
INVOICE.CREATED 8:30PM AUG 6

EVENT DETAILS
RESEND EVENT
411
434
INVOICE.PAYMENT_SUCCEEDED
RESPONSE
404 EVENT NOT DELIVERED:
EVENT DESTINATION NOT FOUND.
EVENT DATA

Figure 5:
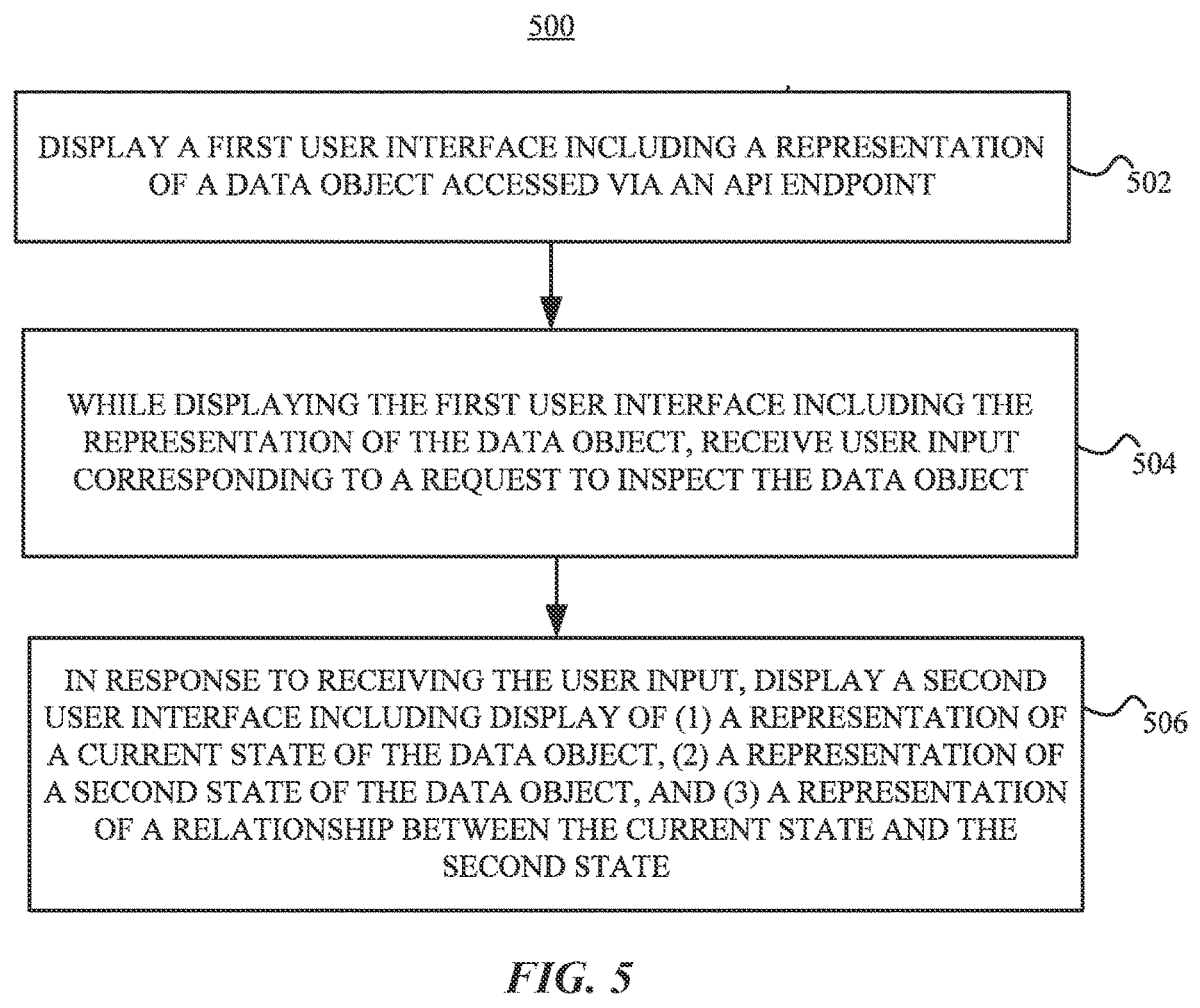

DISPLAY A FIRST USER INTERFACE INCLUDING A REPRESENTATION OF A DATA OBJECT ACCESSED VIA AN API ENDPOINT

502

WHILE DISPLAYING THE FIRST USER INTERFACE INCLUDING THE REPRESENTATION OF THE DATA OBJECT, RECEIVE USER INPUT CORRESPONDING TO A REQUEST TO INSPECT THE DATA OBJECT

504

IN RESPONSE TO RECEIVING THE USER INPUT, DISPLAY A SECOND USER INTERFACE INCLUDING DISPLAY OF (1) A REPRESENTATION OF A CURRENT STATE OF THE DATA OBJECT, (2) A REPRESENTATION OF A SECOND STATE OF THE DATA OBJECT, AND (3) A REPRESENTATION OF A RELATIONSHIP BETWEEN THE CURRENT STATE AND THE SECOND STATE

UNIVERSAL DEVELOPER ENVIRONMENT FOR DEVELOPING AND MANAGING INTEGRATIONS FOR API PLATFORMS

TECHNICAL FIELD

Techniques are disclosed for providing a development interface that surfaces context-specific information for building or debugging integrations within a platform. A client user interface displays one or more platform-managed objects, and a development user interface is presented concurrently to show representations of those objects and their associated configurations, states, and events. The development user interface updates dynamically based on what is displayed in the client user interface. When an indication is received that an object is in a first state associated with a user configuration, a corresponding representation is shown in the development user interface. Upon detecting an event indicating a transition of the object to a second state, updated representations of the object are displayed in both the development user interface and the client user interface. These techniques provide real-time visibility into object states, configurations, and platform-managed resources as they evolve over time.

BACKGROUND

Many applications use platforms to perform operations. Such platforms can store resources for the applications. Understanding what is occurring with respect to the platforms can be difficult and/or inefficient, particularly at scale. For example, users are sometimes required to send individual application programming interface (API) requests to obtain information from an API platform. Accordingly, there is a need to improve techniques for building and/or debugging an integration with a platform.

SUMMARY

This disclosure provides techniques for aiding in building and/or debugging an integration with a platform. In some examples, the tool can be context specific such that the tool includes display of information corresponding to what is being displayed in a client user interface of the platform. For example, a dashboard of an API platform can display information about an API object of the API platform. In such an example, while the dashboard includes display of the information, the tool can display other information about and/or allow interactions with the API object that is stored and/or managed by the API platform, such as events that occurred with respect to the API object, log events associated with the API object, and/or different states of the API object. In some examples, the tool can be globally available throughout the platform to display information corresponding to different surfaces and/or different user interfaces. For example, rather than a dashboard, a webpage and/or user interface provided by the platform can be configured to look a certain way. In such an example, while displaying the webpage and/or user interface, the tool can display information (e.g., a color of a user-interface element) about configurations of the platform that are used to produce the webpage and/or user interface. In some examples, a development user interface of the tool can change based on what is being displayed in a client user interface of the platform. For example, the development user interface can display information corresponding to a first client user interface and, when the first client user interface is changed to a second client user interface, the development user interface can display information corresponding to the second client user interface instead of the first client user interface. Such techniques as described above can allow for visibility into the platform over time, including how remote resources are affected by the user, other users, and/or the platform.

In some examples, a method that is performed by a computer system is described. In some examples, the method comprises: displaying a development user interface from a client user interface, wherein the development user interface displays representations of one or more objects associated with the client user interface; receiving an indication that a first object of the one or more objects from the client user interface is in a first state, wherein the first state is associated with a user configuration; in response to receiving the indication that the first object is in the first state, displaying a first representation of the first object in the development user interface, wherein the first representation of the first object indicates the first object is in the first state; while displaying the first representation of the first object in the development user interface, detecting a first event associated with a change in the user configuration, wherein the first event indicates the first object has transitioned to a second state different from the first state; and in response to detecting the first event associated with the change in the user configuration, displaying: an updated representation of the first object in the development user interface; and an updated representation of the first object in the client user interface.

In some examples, a non-transitory computer-readable storage medium storing one or more programs configured to be executed by one or more processors of a computer system is described. In some examples, the one or more programs includes instructions for: displaying a development user interface from a client user interface, wherein the development user interface displays representations of one or more objects associated with the client user interface; receiving an indication that a first object of the one or more objects from the client user interface is in a first state, wherein the first state is associated with a user configuration; in response to receiving the indication that the first object is in the first state, displaying a first representation of the first object in the development user interface, wherein the first representation of the first object indicates the first object is in the first state; while displaying the first representation of the first object in the development user interface, detecting a first event associated with a change in the user configuration, wherein the first event indicates the first object has transitioned to a second state different from the first state; and in response to detecting the first event associated with the change in the user configuration, displaying: an updated representation of the first object in the development user interface; and an updated representation of the first object in the client user interface.

In some examples, a transitory computer-readable storage medium storing one or more programs configured to be executed by one or more processors of a computer system is described. In some examples, the one or more programs includes instructions for: displaying a development user interface from a client user interface, wherein the development user interface displays representations of one or more objects associated with the client user interface; receiving an indication that a first object of the one or more objects from the client user interface is in a first state, wherein the first state is associated with a user configuration; in response to receiving the indication that the first object is in the first state, displaying a first representation of the first object in the development user interface, wherein the first representation of the first object indicates the first object is in the first state; while displaying the first representation of the first object in the development user interface, detecting a first event associated with a change in the user configuration, wherein the first event indicates the first object has transitioned to a second state different from the first state; and in response to detecting the first event associated with the change in the user configuration, displaying: an updated representation of the first object in the development user interface; and an updated representation of the first object in the client user interface.

In some examples, a computer system comprising one or more processors and memory storing one or more program configured to be executed by the one or more processors is described. In some examples, the one or more programs includes instructions for: displaying a development user interface from a client user interface, wherein the development user interface displays representations of one or more objects associated with the client user interface; receiving an indication that a first object of the one or more objects from the client user interface is in a first state, wherein the first state is associated with a user configuration; in response to receiving the indication that the first object is in the first state, displaying a first representation of the first object in the development user interface, wherein the first representation of the first object indicates the first object is in the first state; while displaying the first representation of the first object in the development user interface, detecting a first event associated with a change in the user configuration, wherein the first event indicates the first object has transitioned to a second state different from the first state; and in response to detecting the first event associated with the change in the user configuration, displaying: an updated representation of the first object in the development user interface; and an updated representation of the first object in the client user interface.

In some examples, a computer system comprising different means is described. In some examples, the computer system comprises means for performing each of the following steps: displaying a development user interface from a client user interface, wherein the development user interface displays representations of one or more objects associated with the client user interface; receiving an indication that a first object of the one or more objects from the client user interface is in a first state, wherein the first state is associated with a user configuration; in response to receiving the indication that the first object is in the first state, displaying a first representation of the first object in the development user interface, wherein the first representation of the first object indicates the first object is in the first state; while displaying the first representation of the first object in the development user interface, detecting a first event associated with a change in the user configuration, wherein the first event indicates the first object has transitioned to a second state different from the first state; and in response to detecting the first event associated with the change in the user configuration, displaying: an updated representation of the first object in the development user interface; and an updated representation of the first object in the client user interface.

In some examples, a computer program product is described. In some examples, the computer program product comprises one or more programs configured to be executed by one or more processors of a computer system. In some examples, the one or more programs include instructions for: displaying a development user interface from a client user interface, wherein the development user interface displays representations of one or more objects associated with the client user interface; receiving an indication that a first object of the one or more objects from the client user interface is in a first state, wherein the first state is associated with a user configuration; in response to receiving the indication that the first object is in the first state, displaying a first representation of the first object in the development user interface, wherein the first representation of the first object indicates the first object is in the first state; while displaying the first representation of the first object in the development user interface, detecting a first event associated with a change in the user configuration, wherein the first event indicates the first object has transitioned to a second state different from the first state; and in response to detecting the first event associated with the change in the user configuration, displaying: an updated representation of the first object in the development user interface; and an updated representation of the first object in the client user interface.

Executable instructions for performing these functions are, optionally, included in a non-transitory computer readable storage medium or other computer program product configured for execution by one or more processors. Moreover, details of one or more examples, implementations, and/or embodiments are set forth in the accompanying drawings and the description below. Other components, features, aspects, and potential advantages will be apparent from the description and drawings, and from the claims.

BRIEF DESCRIPTION OF THE FIGURES

For a better understanding of the various described embodiments, reference should be made to the Detailed Description below in conjunction with the following figures in which like reference numerals refer to corresponding parts throughout the figures.

FIGS. 4A-4F are exemplary user interfaces for inspecting remote resources in accordance with one or more examples described herein.

FIG. 5 is a flow diagram illustrating a method for inspecting remote resources in accordance with one or more examples described herein.

DETAILED DESCRIPTION

The detailed description described below describes various examples with reference to the accompanying drawings. Some, but not all, examples are shown and described herein. Indeed, the examples can take many different forms and/or be augmented in many different ways. Accordingly, this disclosure should not be construed as limited to the examples set forth herein. Rather, these examples are provided so that this disclosure will satisfy applicable legal requirements.

Figure 1:
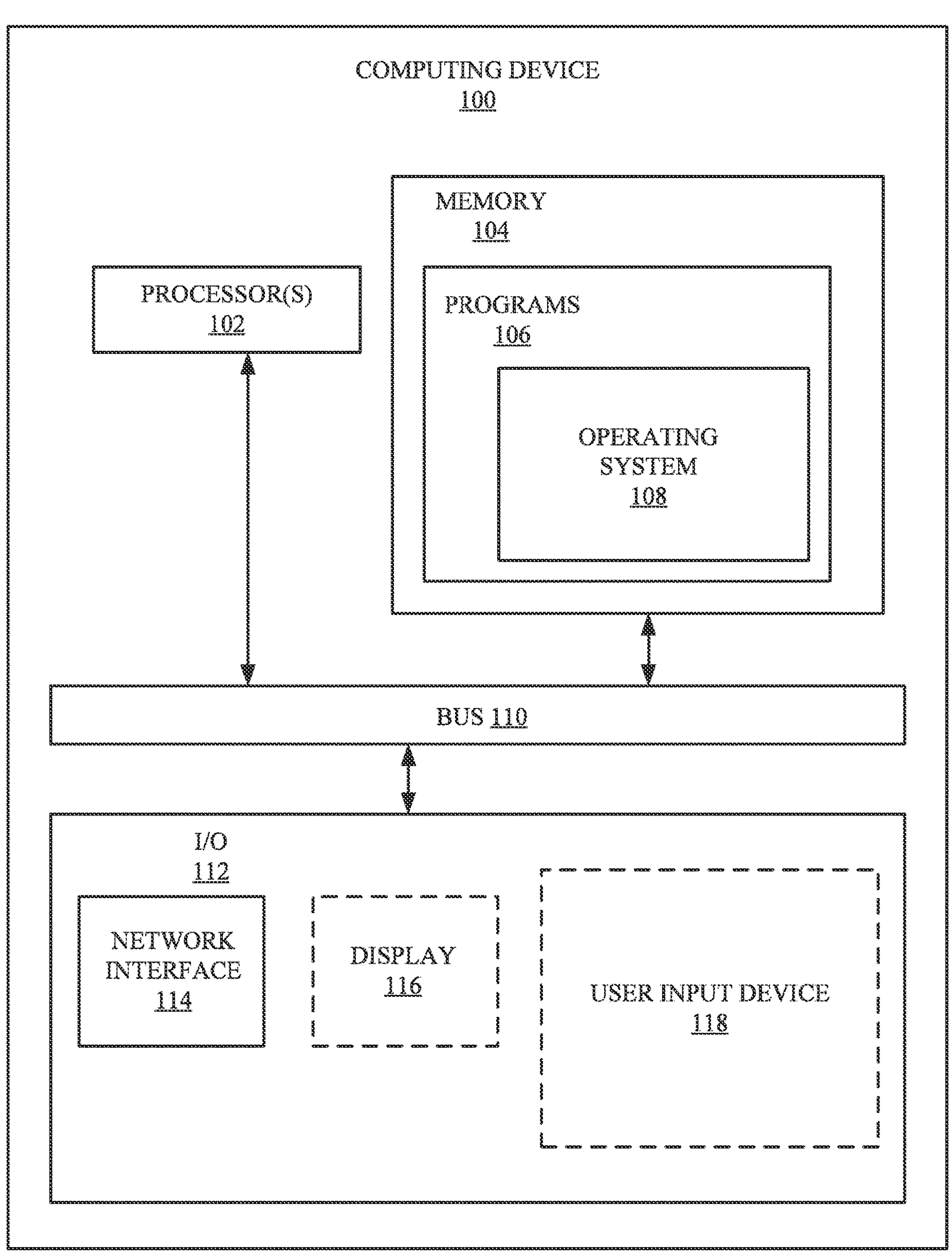
FIG. 1 is a block diagram of a computing device that implements one or more processes in accordance with one or more examples described herein.

FIG. 1 illustrates an example computing device 100 (alternatively referred to as computing system 100, computer system 100, system 100, or device 100) that can be used to support and/or implement the architecture and operations in accordance with one or more examples described herein. It will be apparent to those of ordinary skill in the art, however, that other alternative systems of various system architectures can also be used. For example, the other alternative systems can be a computing system with fewer, different, and/or additional components than those illustrated in FIG. 1 or a computing system including multiple computing devices 100. In some embodiments, computing device 100 is a general-purpose computer. In some embodiments, computing device 100 is a special purpose (e.g., application specific) hardware device.

Computing device 100 illustrated in FIG. 1 includes one or more buses 110 (or other internal communication component) for communicating information, and one or more processors 102 coupled to the bus 110 for processing information. Device 100 includes memory 104 coupled to bus 110. Memory 104 can include random access memory (RAM) or other volatile storage device for storing information and instructions to be executed by one or more processors 102, and/or for storing temporary variables or other intermediate information during execution of instructions by one or more processors 102. Memory 104 can also include non-volatile memory storage, such as read-only memory (ROM) and/or a static storage device for storing static information and instructions for one or more processors 102, and one or more data storage devices such as a hard disk (e.g., magnetic disk), flash memory storage, or optical disk and its corresponding disk drive. This data storage device can be coupled to bus 110 for storing information and instructions. For example, memory 104 can store programs 106 in non-volatile memory, the programs including one or more sets of computer-executable instructions for execution by the one or more processors 102. When ready for execution, the instructions are loaded into volatile memory and passed the processors for execution. Programs 106 can include operating system 108 for managing the computing device's basic functionality, such as scheduling tasks, executing applications, and controlling peripherals. As used herein, the term "program" or "computer program" are considered synonymous with "application," "computer application, or "application component" unless otherwise stated in the context in which the term is used.

Computing device 100 can also include input/output (I/O) component 112. FIG. 1 illustrates several example I/O components grouped together within I/O component 112 for illustration purposes only, and each such component therein does not necessarily need to be located together, or within any part of computing device 100. For example, I/O component 112 can be an external device coupled to an interface of device 100. Computing device 100 can include one or more network interfaces 114 for handling uplink and/or downlink communications with one or more other devices. The network interface 114 can itself be a communication device and can include any of a number of commercially available networking peripheral devices such as those used for coupling to an Ethernet connection, Wi-Fi connection, 3GPP mobile communication protocol (e.g., 3G, 4G, LTE, 5G, NR, and/or the like), and/or the like, for communication over the Internet, a wide area network, a local area network, an ad-hoc (device-to-device network), or the like. Network interface 114 can be a modem connection, and/or any other mechanism that provides connectivity between computing device 100 and one or more other devices. Note that any or all of the components of this system illustrated in FIG. 1 and associated hardware can be used in various embodiments as discussed herein.

Computing device 100 can optionally be coupled to one or more display device 116, such as a light emitting diode (LED) display or a liquid crystal display (LCD) (e.g., coupled through bus 110 for displaying information to a user of computing device 100). Display device 116 can be integrated into computing device 100 (e.g., a touchscreen of a smartphone) or be external to computing device 100 (e.g., an external display coupled via a cable with device 100).

Computing device 100 can optionally include user input device 118, such as an alphanumeric input device (e.g., keyboard), a cursor control or other input signaling device (e.g., a touch-sensitive display (touchscreen), a touchpad, mouse, a trackball, stylus, or cursor direction keys) for controlling cursor movement and/or selection on a user interface displayed using display device 116.

In some embodiments, computing device 100 is a server or system of servers. For example, the server can be a collection of one or more computer hardware machines working together to perform processes and tasks described with respect to computing device 100. Thus, computing device 100 can be considered a logical construct, and references thereto can and should be interpreted as encompassing scope that includes computing device 100 being comprised of one or more computing devices (e.g., as device 100 is described) or several devices that together behave as computing device 100 has been described. As one of skill would appreciate, there is no requirement express or implied herein that the components of computing device 100 be dedicated or physical resources, or that the components must be located physically together. Rather, computing device 100 can be embodied in one or more virtual machines and/or certain functional components of computing device 100 can be remote from other functional components of device 100.

Figure 2:
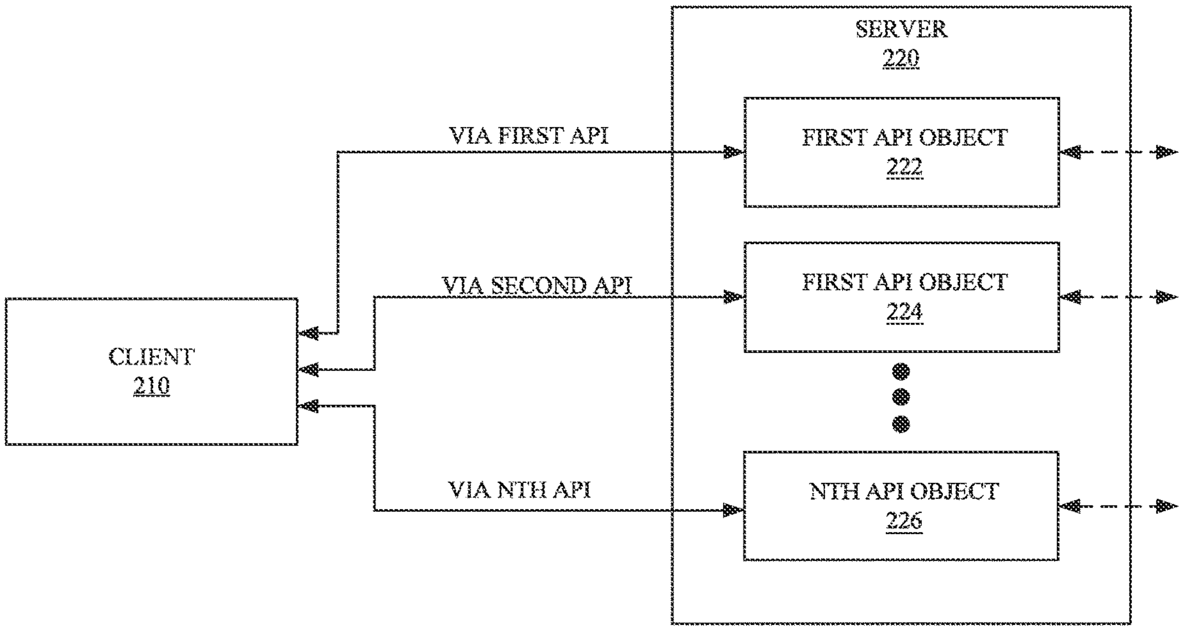
FIG. 2 is a block diagram illustrating communications between a client and a server in accordance with one or more examples described herein.

FIG. 2 illustrates a block diagram of client 210 communicating with server 220 in accordance with some examples described herein. In some examples, server 220 is part of a platform that is providing services to client 210. Client 210 and/or server 220 can include one or more components described above with respect to computing device 100.

In some examples, client 210 is communicating with server 220 via a network, such as the Internet, a wide area network, a local area network, a cellular communications network, or a combination of networks. In such examples, client 210 can be interacting with an application that is using server 220 to perform operations with resources (sometimes referred to as remote resources, API resources, API objects, and/or configurations) stored by server 220. Such operations can be performed by server 220 in response to server 220 receiving a communication from client 210 via an API endpoint. For example, client 210 can send a communication to server 220 via a first API endpoint, the communication to change a current state of a first API object 222 to a different state. Similarly, client 210 can send other communications via other API endpoints (e.g., a second API endpoint and/or an nth API endpoint) to interact with other resources (e.g., second API object 224 and/or nth API object 226). Resources can also transition between different states based on different events occurring. For example, server 220 can make different determinations and/or communicate with different computer systems separate from server 220 and/or client 210.

In some examples, the application mentioned above is hosted at least in part by server 220. The portion of the application hosted by server 220 can be accessed by many different clients that each have their own relationship with the application. In such examples, server 220 can store different resources for different clients, a state of the different resources accessible through server 220 by the clients and/or an administrator of the application via one or more API endpoints.

With the above description in mind, attention is now turned towards techniques for inspecting remote resources. Such techniques are described with respect to a user (e.g., a developer, an administrator, a customer, and/or other type of user) interacting with interfaces provided by a server (e.g., server 220) (e.g., a website being viewed on a device, an application executing on the device, and/or any graphical user interface displayed on the device with information from the server). It should be recognized that other contexts can use techniques described herein. For example, an application executing on a client can store data for which are inspected by the client using techniques described herein.

FIGS. 3A-3F are exemplary user interfaces for creating an event destination in accordance with one or more examples described herein. As used herein, an event destination is an abstraction for different types of destinations that are notified when different events occur. For example, an event destination can define one or more events that cause a destination (e.g., sometimes referred to as an endpoint) to be notified when the one or more events occur. Using terminology described above, (1) the destination of the event destination can be an API object (e.g., first API object 222) that is being inspected and/or (2) changes to the API object that is being inspected can be the one or more events of the event destination.

Figure 3A:
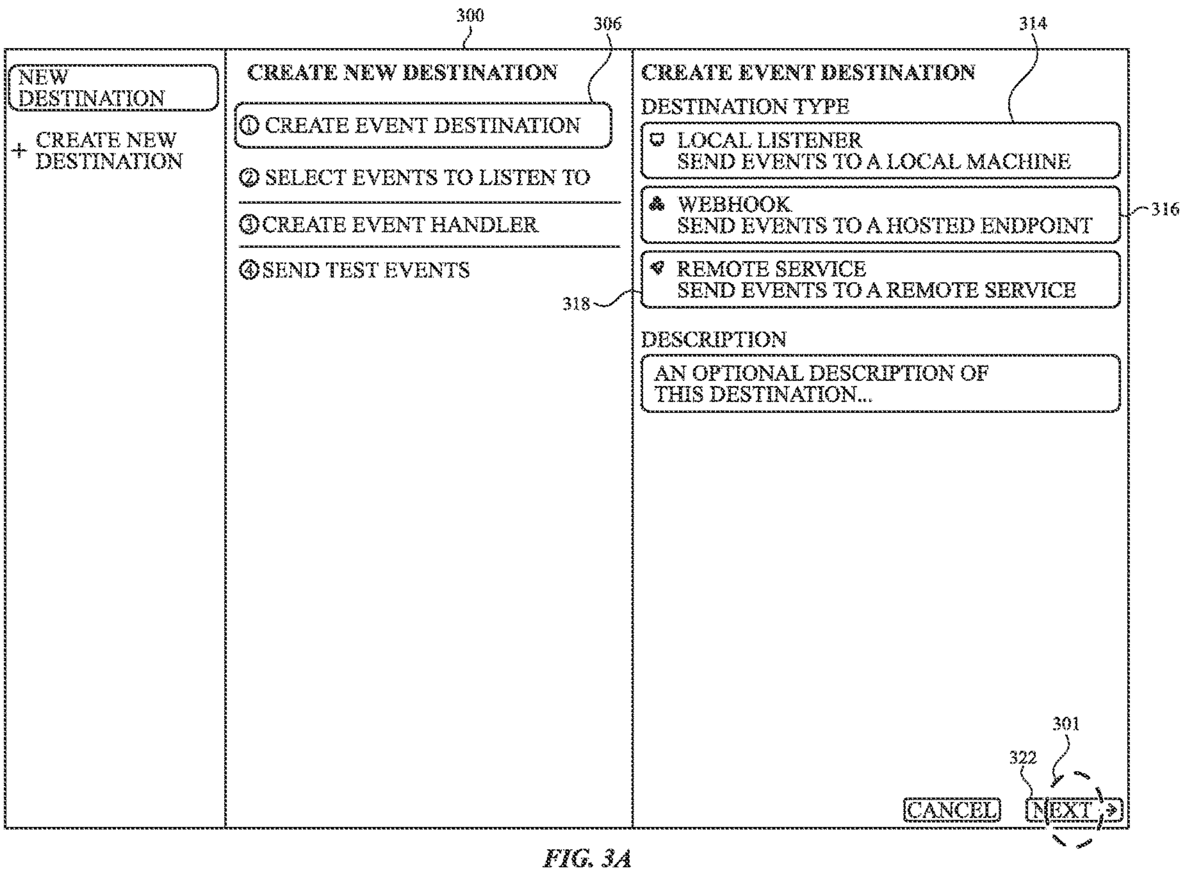
FIGS. 3A-3F are exemplary user interfaces for creating an event destination in accordance with one or more examples described herein.

As illustrated, FIGS. 3A-3F are in the context of a developer using a device signed into a host platform to configure an application to accept subscriptions for an application. As part of configuring the application, the developer can create an event destination. To get started, the developer navigates to a user interface for creating an event destination, as illustrated in FIG. 3A.

Figure 3B:
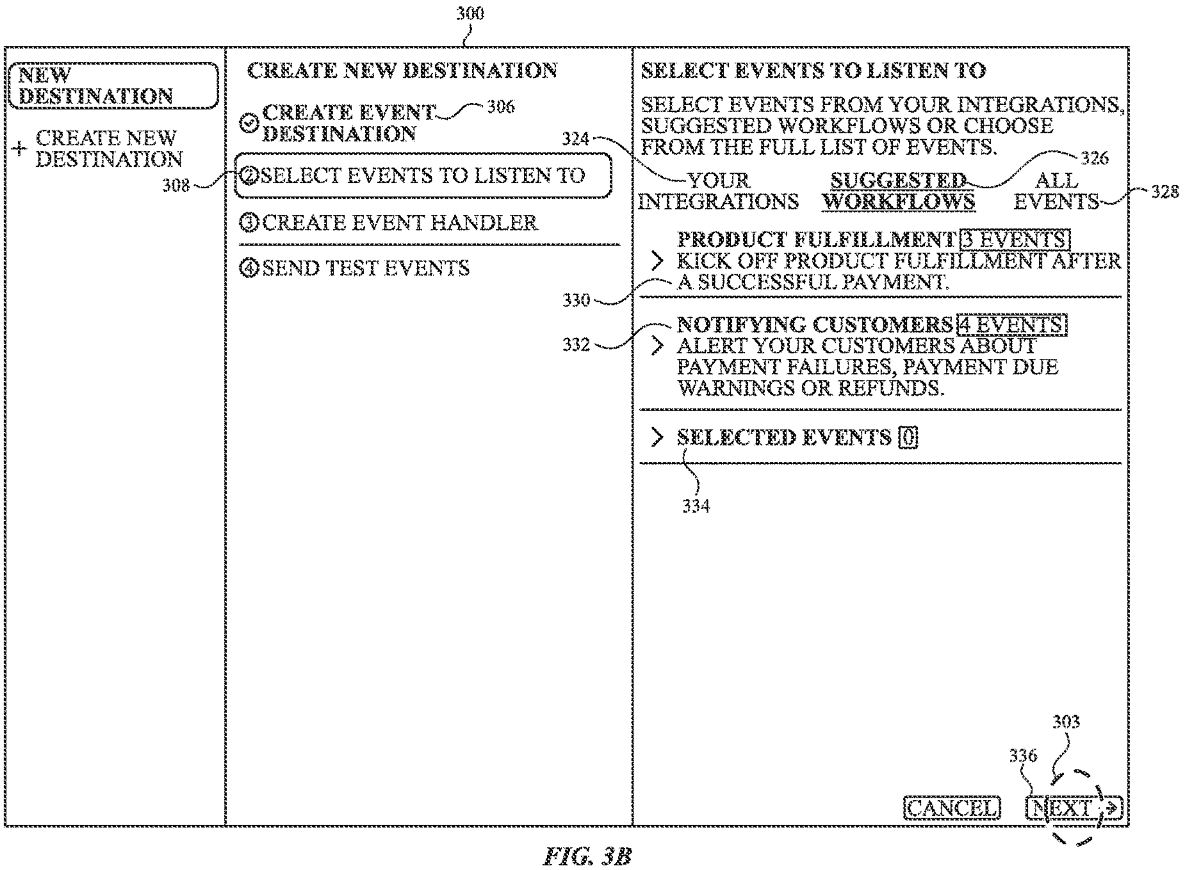

FIG. 3A illustrates creation user interface 300, for creating an event destination. In some examples, the event destination can be created in a test or live environment. As depicted in FIGS. 3A-3E, the event destination is created in a test environment and then, as depicted in FIG. 3F, the event destination is published to a live environment.

In FIG. 3A, creation user interface 300 includes a middle portion including stages required for creating an event destination and a right portion including steps related to a current stage. In FIG. 3B, first stage 306 is highlighted, indicating that the current stage is to create an event destination. It should be recognized that more or less stages can be required for creating an event destination, one or more stages can be in a different order, and/or one or more stages can be optional.

As part of first stage 306, the right portion of creation user interface 300 includes two options to configure: a destination type and a description. For the destination type, the right portion includes multiple user-interface elements to select different destination types for an event destination (e.g., where to send events when they occur). Such destination types include local listener 314, webhook 316, and remote service 318. Other types of event destinations can include different models, such as bi-directional protocols (e.g., WebSockets or TCP/IP communication), subscription/publication model, and/or other types of models.

Selection of local listener 314 can create a destination as a location on a local machine such that a notification of an event occurring is not sent across a network but rather remains on the local machine when being reported. Selection of webhook 316 can create a destination as a hosted endpoint (e.g., via a URL) such that a notification of an event occurring is sent to the hosted endpoint (e.g., a HTTP webhook endpoint) when the event occurs. Selection of remote service 318 can create a destination as a remote service such that a notification of an event occurring is sent to a third-party process that is configured to receive the notification and optionally process the notification. In some examples, remote service 318 is different from webhook 316 in that communications to a remote service are configured according to a schema associated with the remote service while communications to a hosted endpoint are configured according to a schema of the host platform. After one of the destination types is selected, the developer can select next 322 (e.g., via tap 301) to transition to the next stage for creating an event destination. In the example described herein, webhook 316 is selected.

FIG. 3B illustrates creation user interface 300 in a second stage of creating an event destination. In some examples, creation user interface 300 of FIG. 3B is displayed in response to selection of next 322. In FIG. 3B, first stage 306 is indicated as being finished and second stage 308 is highlighted, indicating that the current stage is to select events to listen to.

As part of second stage 308, the right portion of creation user interface 300 includes different options to select events: your integrations 324, suggested workflows 326 and all events 328. Your integrations 324 corresponds to a set of events that the developer has previously configured. Suggested workflows 326 corresponds to a set of events that have been configured by someone other than the developer (e.g., a different developer of the host platform). All events 328 corresponds to all possible events that can be added to an event destination. As illustrated in FIG. 3B, suggested workflows 326 is selected and two different pre-set workflows (e.g., first workflow 330 and second workflow 332) are displayed. In FIG. 3B, first workflow 330 corresponds to 3 events to kick off product fulfillment after a successful payment. In FIG. 3B, second workflow 332 corresponds to 4 events to alert customers about payment failures, payment due warning or refunds. Below the different options to select events, creation user interface 300 includes events 334 to show different events that are selected for the event destination being created. After selecting events to listen for, the developer can select next 336 (e.g., via tap 303) to transition to the next stage for creating an event destination.

Figure 3C:
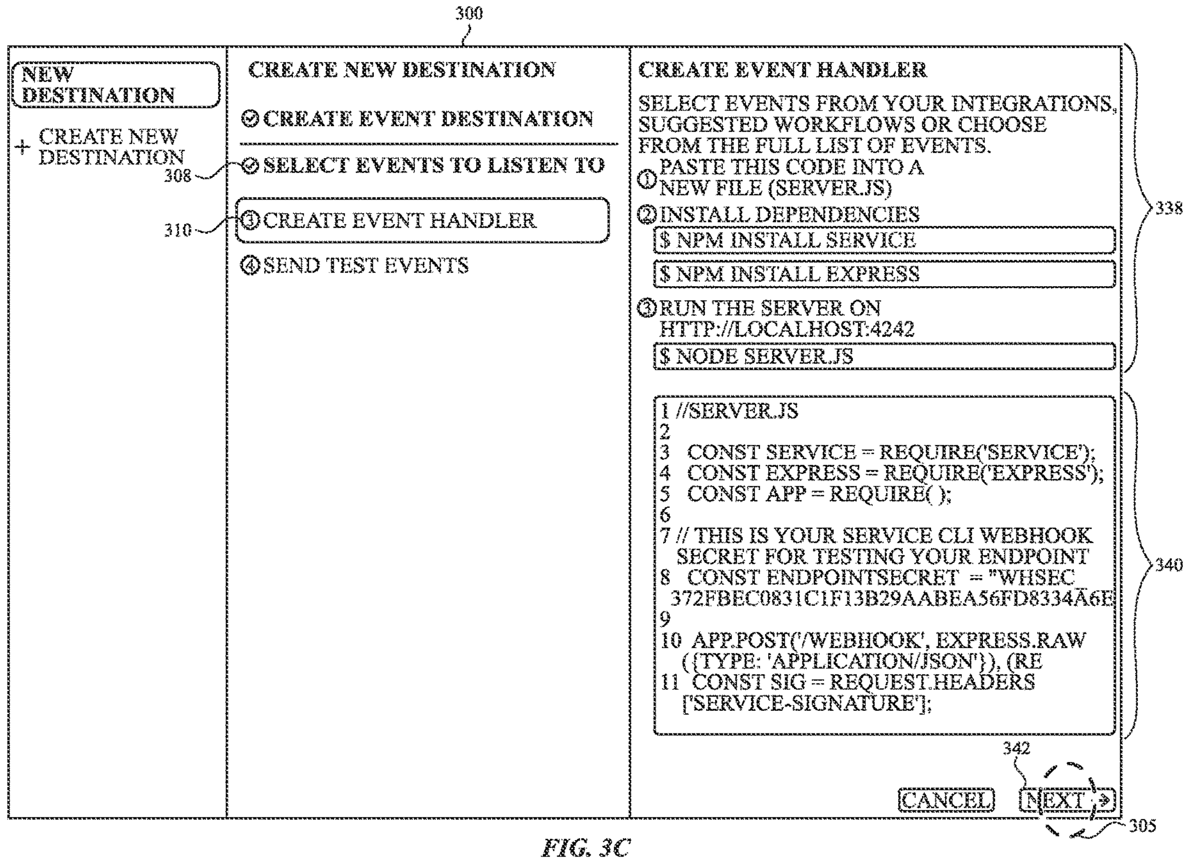

FIG. 3C illustrates creation user interface 300 in a third stage of creating an event destination. In some examples, creation user interface 300 of FIG. 3C is displayed in response to selection of next 336. In FIG. 3C, second stage 308 is indicated as being finished and third stage 310 is highlighted, indicating that the current stage is to create event handlers. This stage is optional in some examples.

As part of third stage 310, the right portion of creation user interface 300 guides the developer to set up an event handler on their device for testing purposes, including three steps 338 to perform and code 340 for use with three steps 338. The first step in three steps 338 indicates that the developer needs to create a new file named "server.js" and paste code 340 in the new file. The second step in three steps 338 indicates that the developer needs to install dependencies and the third step in three steps 338 indicates that the developer needs to run the server at a particular location. For these steps, the right portion of creation user interface 300 includes what the developer needs to type to perform three steps 338. After performing three steps 338, the developer can select next 342 (e.g., via tap 305) to transition to the next stage for creating an event destination.

Figure 3D:
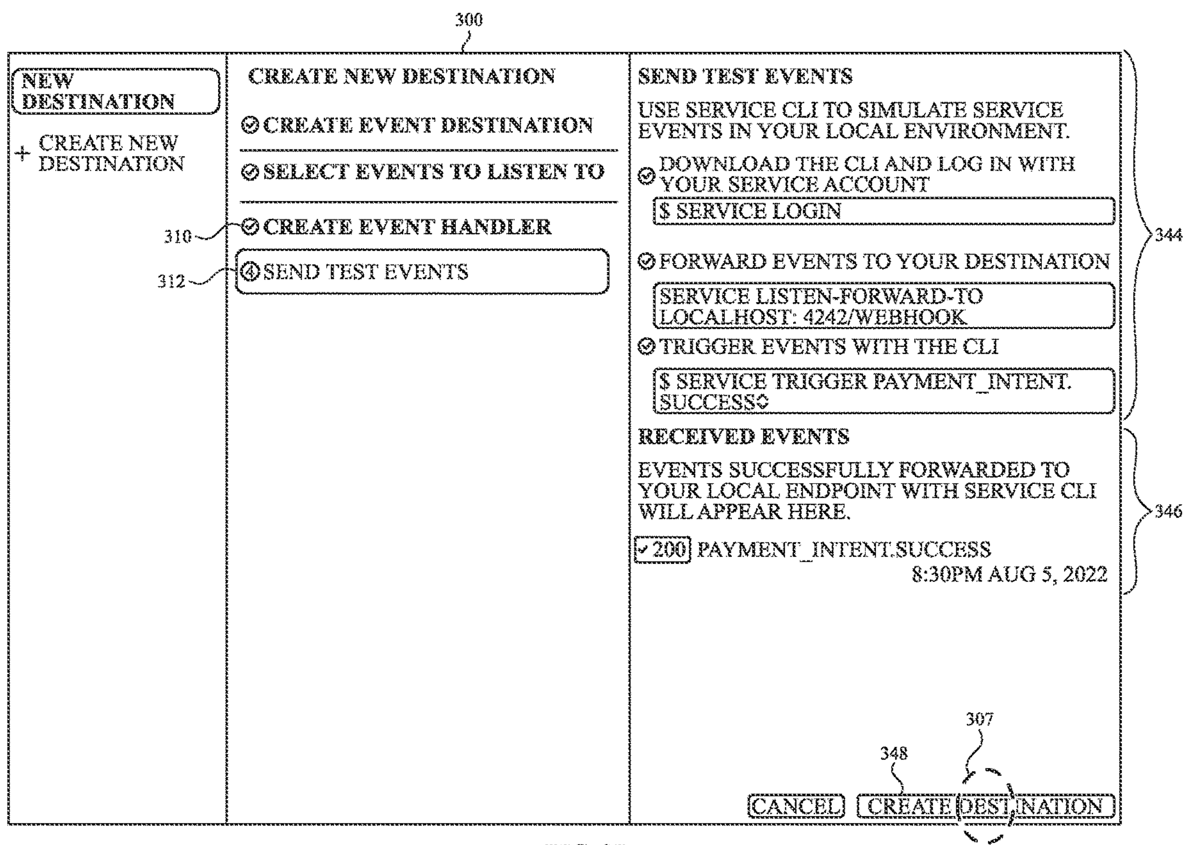

FIG. 3D illustrates creation user interface 300 in a fourth stage of creating an event destination. In some examples, creation user interface 300 of FIG. 3D is displayed in response to selection of next 342. In FIG. 3D, third stage 310 is indicated as being finished and fourth stage 312 is highlighted, indicating that the current stage is to send test events. This stage is optional in some examples.

As part of fourth stage 312, the right portion of creation user interface 300 guides the developer to send test events on their device, including three steps 344 to perform and list 346 of events that were successfully received using three steps 344. The first step in three steps 344 indicates that the developer needs to download a command line interface (CLI) corresponding to the host platform and log in with their service account. The second step in three steps 344 indicates that the developer needs to forward events to their destination and the third step in three steps 344 indicates that the developer needs to trigger events with the CLI. For these steps, the right portion of creation user interface 300 includes what the developer needs to type to perform three steps 344. After each event is triggered using three steps 344, the developer can see the events received in list 346. To navigate from fourth stage 312, the developer can select create 348 (e.g., via tap 307) to transition to finish creating an event destination.

Figure 3E:
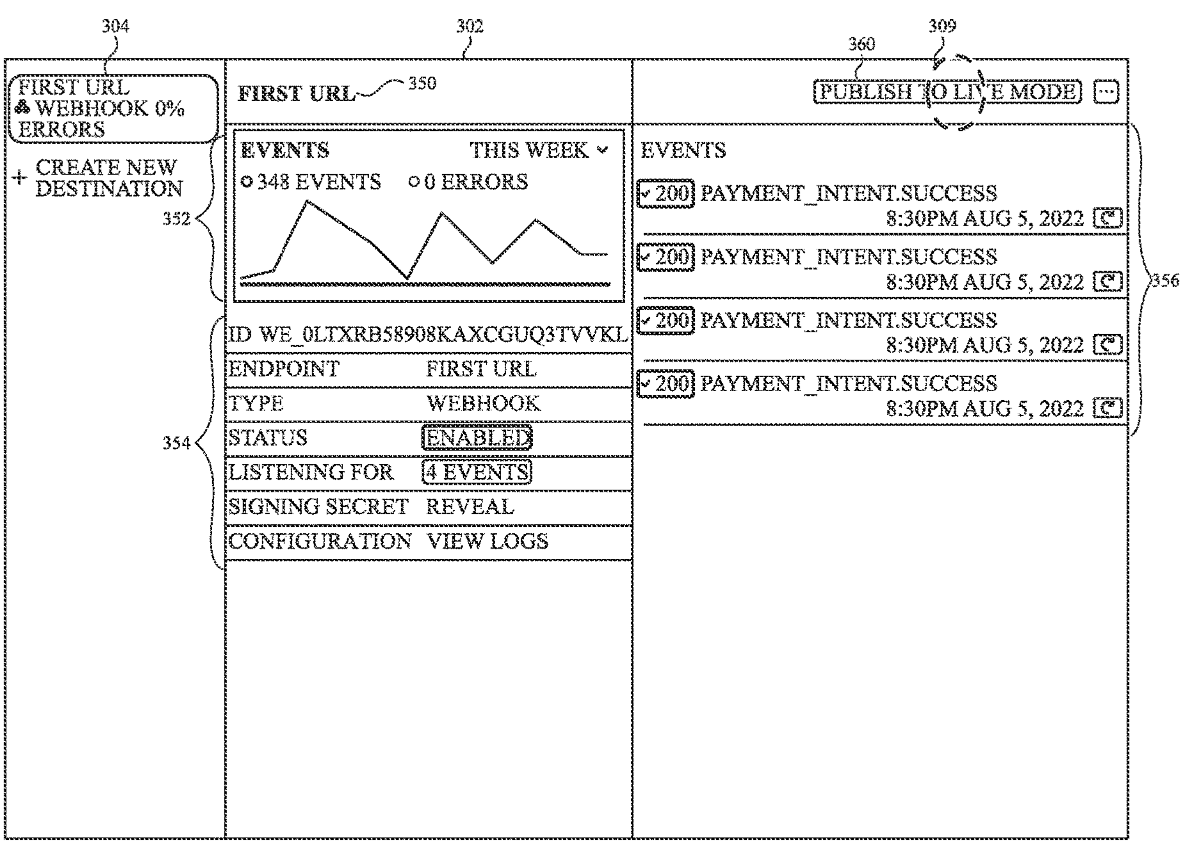
Figure 3F:
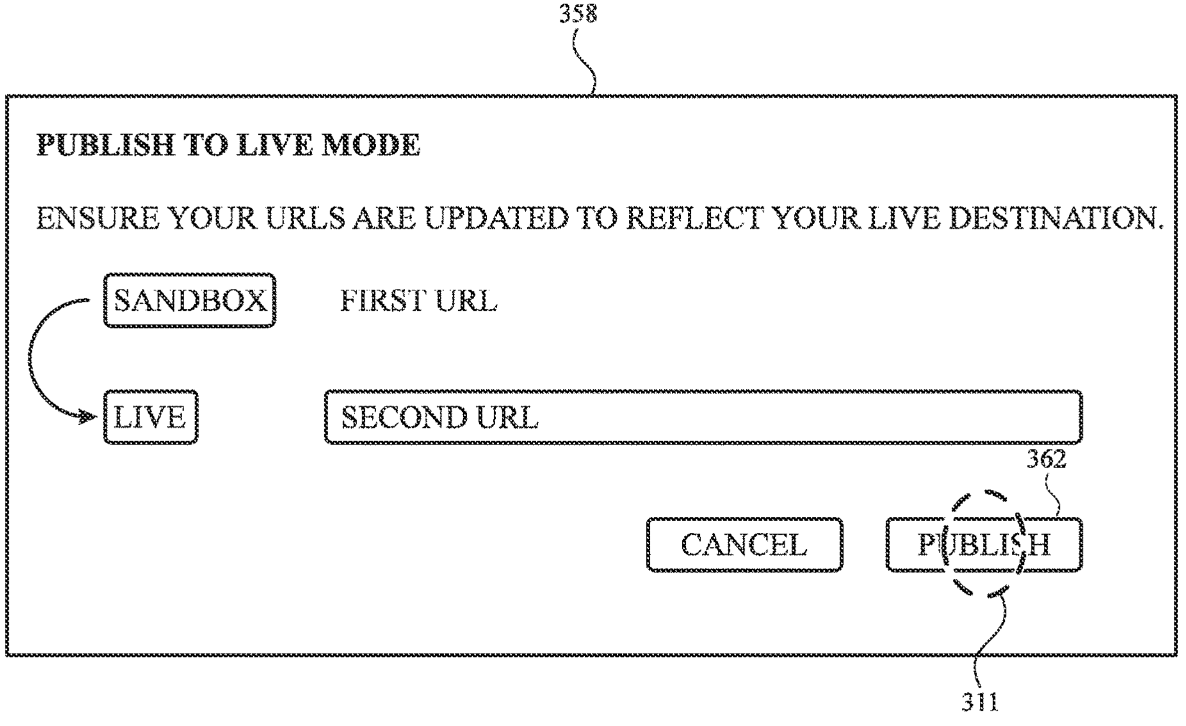

FIG. 3E illustrates status user interface 302, for viewing a status of an event destination that has been created. In some examples, status user interface 302 is displayed in response to selection of create 348 in creation user interface 300 of FIG. 3D. In other examples, one or more additional inputs are required to navigate to status user interface 302 after selecting create 348. As illustrated in FIG. 3E, status user interface 302 is divided into three columns.

The left column of status user interface 302 includes an indication that a particular event destination has been selected. In FIG. 3E, first URL 304 is selected, indicating that a webhook (e.g., the webhook created using steps described above with respect to FIGS. 3A-3D) has not had any errors (e.g., delivery of events to the designated destination has occurred successfully). If other event destinations were created by the developer, the left column would include other indications of the other event destinations, each indication selectable to change to see a status of a corresponding event destination.

The middle column of status user interface 302 includes an overview of a selected event destination. The overview includes indication 350 (indicating which event destination is selected), graph 352 (indicating usage of the event destination over a period of time (e.g., this week) with number of events and number of errors), and information 354 specific to the selected event destination. As illustrated, information 354 includes an identifier for the selected event destination, an endpoint for the selected event destination, a type for the selected event destination, a status for the selected event destination, a signing secret for the selected event destination (e.g., a signature for verifying that a communication received at a destination is legitimate), and logs for configuration of the selected event destination. It should be recognized that information 354 can include more, less, and/or different information than illustrated and that certain types of event destinations can include more, less, and/or different information than other types of event destinations.

The right column of status user interface 302 includes list 356 of events that occurred with respect to the selected event destination. As illustrated in FIG. 3E, list 356 includes events that occurred on a particular day, with an icon on the left representing the code produced as a result of delivery of an event (e.g., 200 indicates that the event was successfully delivered), a name of the event that occurred, a time that the event occurred, and a user-interface element to cause, when selected, the event to be re-delivered.

As illustrated in FIG. 3E, status user interface 302 includes publish 360. In some examples, selection of publish 360 causes a process to be initiated to convert the selected event destination from a test environment to a live environment. In FIG. 3E, the developer has selected publish 360 via tap 309.

FIG. 3F illustrates publish user interface 358, for publishing an event destination to a live environment. The live environment can have access to different data than the test environment and/or different types/sets of users can have access to the live environment than the test environment. In some examples, publish user interface 358 is displayed in response to selection of create 348 in status user interface 302. As illustrated in FIG. 3F, the developer is able to modify the URL used for the event destination in a live environment. Once the developer is satisfied with the URL, the developer can select publish 362 to convert the selected event destination to the live environment. In FIG. 3F, the developer has selected publish 362 via tap 311. After converting the selected event destination to the live environment, the developer can inspect remote resources associated with the selected event destination using user interfaces described below. Such inspection can be used when monitoring how an integration is working.

FIGS. 4A-4F are exemplary user interfaces for inspecting remote resources in accordance with one or more embodiments described herein. As mentioned above, in some examples, a remote resource can be a destination of an event destination and, in other examples, changes to a remote resource can be events of an event destination that causes a destination (e.g., different from the remote resource) to be notified.

Figure 4A:
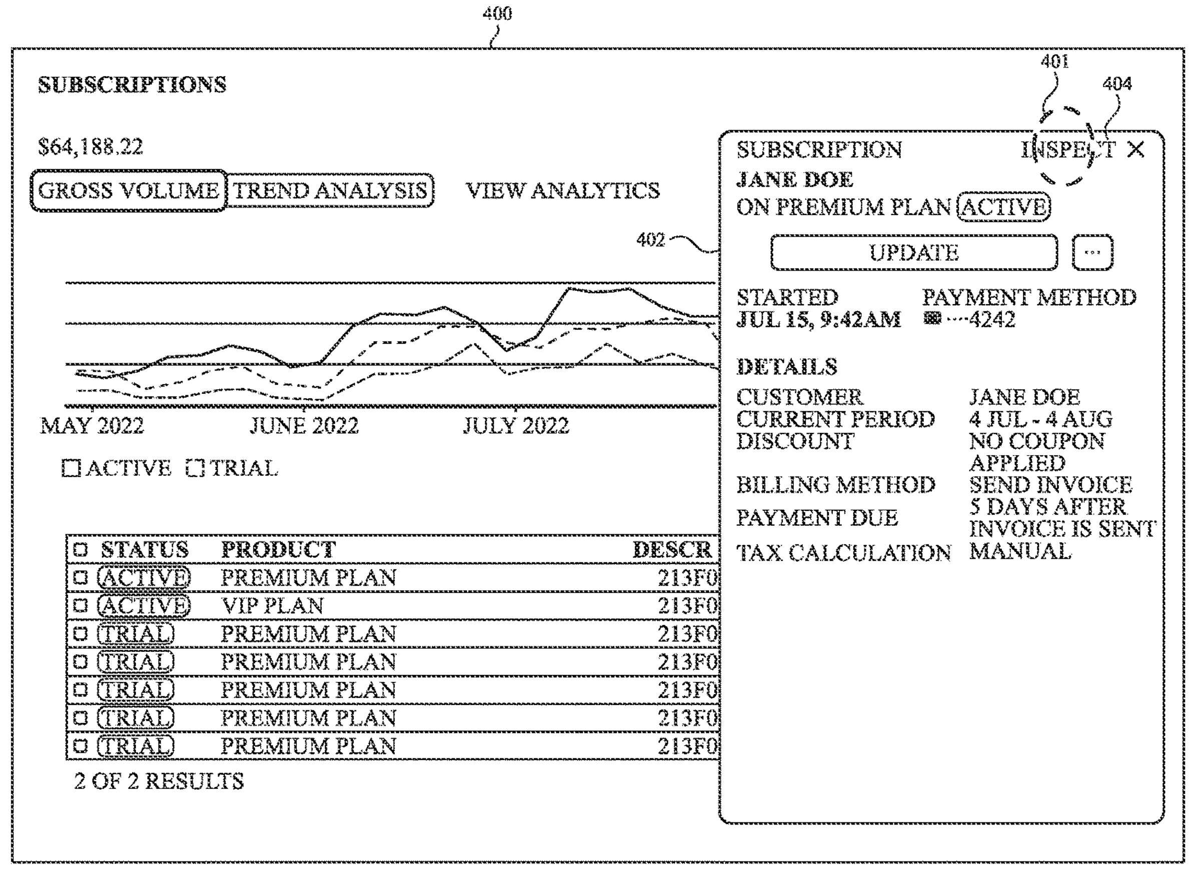

FIG. 4A illustrates dashboard 400, for viewing information about an application (e.g., an application that is at least partly executed by a server with the server storing remote resources (e.g., API objects) in different states). Dashboard 400 can be navigated to by an administrator of the application to view information related to how other users (e.g., customers and/or clients of the application) have been interacting with the application. For illustrative purposes, the following discussion will be based on a hypothetical situation where Jane Doe has an issue with a subscription to the application. As a result, the administrator can navigate to dashboard 400 to investigate.

As illustrated in FIG. 4A, dashboard 400 includes information related to subscriptions for different customers. In some examples, a subscription of a customer is a remote resource (e.g., an API object) stored on a server that, when changes occur, causes a notification to be sent to a destination of an event destination that is configured according to techniques described above with respect to FIGS. 3A-3F. In other examples, a subscription of a customer is a destination for an event destination that is configured according to techniques described above with respect to FIGS. 3A-3F. In either sets of examples, the subscription of the customer can be in different states.

As illustrated in FIG. 4A, dashboard 400 includes overlay 402 that is specific to a subscription API object for a particular customer (i.e., Jane Doe). Overlay 402 indicates various information about the subscription API object, including when it started and that the subscription API object is active. To view additional information with respect to the subscription API object, the administrator can inspect the subscription API object using inspect 404. Accordingly, FIG. 4A illustrates tap 401 on inspect 404.

Figure 4B:
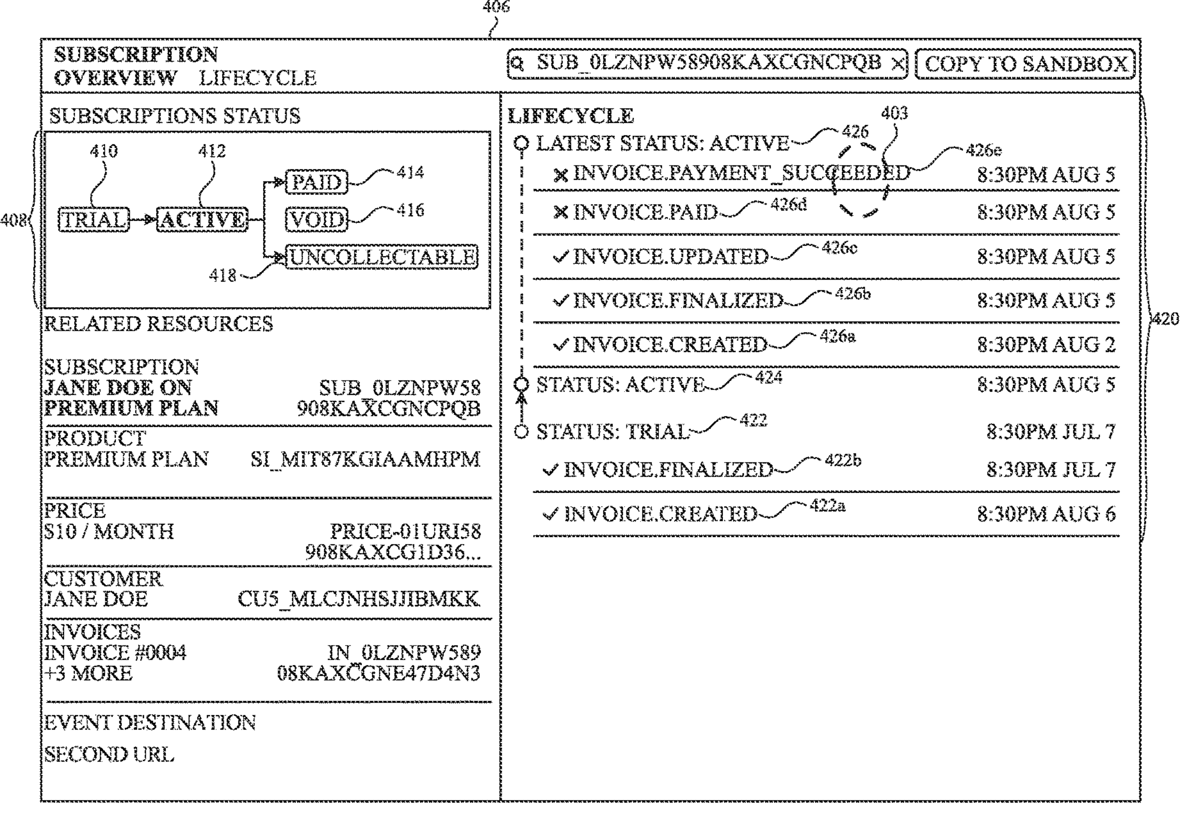

FIG. 4B illustrates inspector 406, a user interface to display information related to a subscription API object. In some examples, inspector 406 of FIG. 4B is displayed in response to selection of inspect 404 (e.g., as illustrated in FIG. 4A).

Inspector 406 in FIG. 4B includes two columns: a left column with an overview of the subscription API object and a right column with a lifecycle for the subscription API object. As illustrated in FIG. 4B, the left column of inspector 406 includes a list of information related to the subscription API object and status graph 408.

The list of information in the left column includes various information included in the subscription API object, such as a customer name corresponding to the subscription API object (i.e., Jane Doe) and a URL at which the subscription API object is located (i.e., second URL).

In some examples, status graph 408 indicates different states that the subscription API object can have. For example, status graph 408 includes 5 different states: trial, active, paid, void, and uncollectable. In addition to showing different states, status graph 408 shows the relationship between each state. For example, trial state 410 is an initial state in status graph 408 and can be transitioned to active state 412 (i.e., the current state as indicated in overlay 402, highlighted in status graph 408, and stated in the right column of inspector 406 in FIG. 4B). For another example, active state 412 in status graph 408 is illustrated as being able to transition into one of three other states (i.e., paid state 414, void state 416, and uncollectable state 418).

In some examples, selection of a state in status graph 408 causes the subscription API object to change to the state selected. For example, selection of paid state 414 (e.g., via a tap on paid state 414) can cause the subscription API object for Jane Doe to be changed to paid state 414 instead of active state 412. In such an example, changing the state can cause one or more events to be sent according to configuration of the subscription API object. In some examples, changes to the state using status graph 408 is restricted to valid transitions (e.g., transitioning from active state 412 to paid state 414 and not from active state 412 to trial state 410). In other examples, selection of a state for which status graph 408 indicates that a current state is not able to move into would be allowed when in this view though would not be allowed during normal operation through events occurring.

It should be recognized that status graph 408 is only one way to show multiple states and their relationships and that techniques described herein apply to any other way to show such information with such functionality as described above. For example, another representation includes bullet points and/or other types of segmentation that allows for certain states to be connected to some states while not being connected to other states.

As illustrated in FIG. 4B, the right column of inspector 406 includes lifecycle graph 420, which indicates some of the information included in status graph 408 and some additional information. For example, lifecycle graph 420 includes a timeline of different states with their relationship. In particular, the left side of lifecycle graph 420 includes indications of different states (e.g., circles) with lines between such indications to indicate flow between such states. In some examples, lifecycle graph 420 also includes an indication of a state when the state began and/or when it ended. For example, trial state 422 has a directed arrow from it to active state 424, indicating that the subscription transitioned from a trial state to an active state. Similarly, active state 424 has an undirected line from it to active state 426, indicating that the subscription is still in the active state (e.g., also indicated by active state 426 including an indication that it is "latest status").

As mentioned above, lifecycle graph 420 includes information additional to states of the subscription API object and their relationship. As illustrated in FIG. 4B, lifecycle graph 420 includes a list of events that occurred while in each state, such as trial state 422 including two events. These two events include invoice created 422*a* and invoice finalized 422*b*. Such events, as illustrated in FIG. 4B, are ordered by when they were received, with the most recent on top. In some examples, some states might not have any events that occurred while in the state.

In some examples, the list of events in lifecycle graph 420 include an indication of whether an event was successfully delivered. For example, such events can be triggered to be sent but never received by the subscription API object or never received by a destination of an event destination configured with changes to the subscription API object as an event. As illustrated in FIG. 4B, a check mark is used to show that an event was successful (e.g., invoice created 422*a*) and an x is used to show that an event was unsuccessful (e.g., invoice paid 426*d*). By the administrator looking at lifecycle graph 420, the administrator can identify that an invoice corresponding to the subscription API object for Jane Doe was never paid (or at least an event corresponding to such payment was not received by the event destination responsible for updating the subscription API object).

In some examples, each event included in the list of events in lifecycle graph 420 is selectable to view additional information regarding the event. Accordingly, for the administrator to investigate the invoice payment not succeeding (e.g., invoice payment succeeded 426*e*), the administrator can select invoice payment succeeded 426*e* using, for example, tap 403.

Figure 4C:
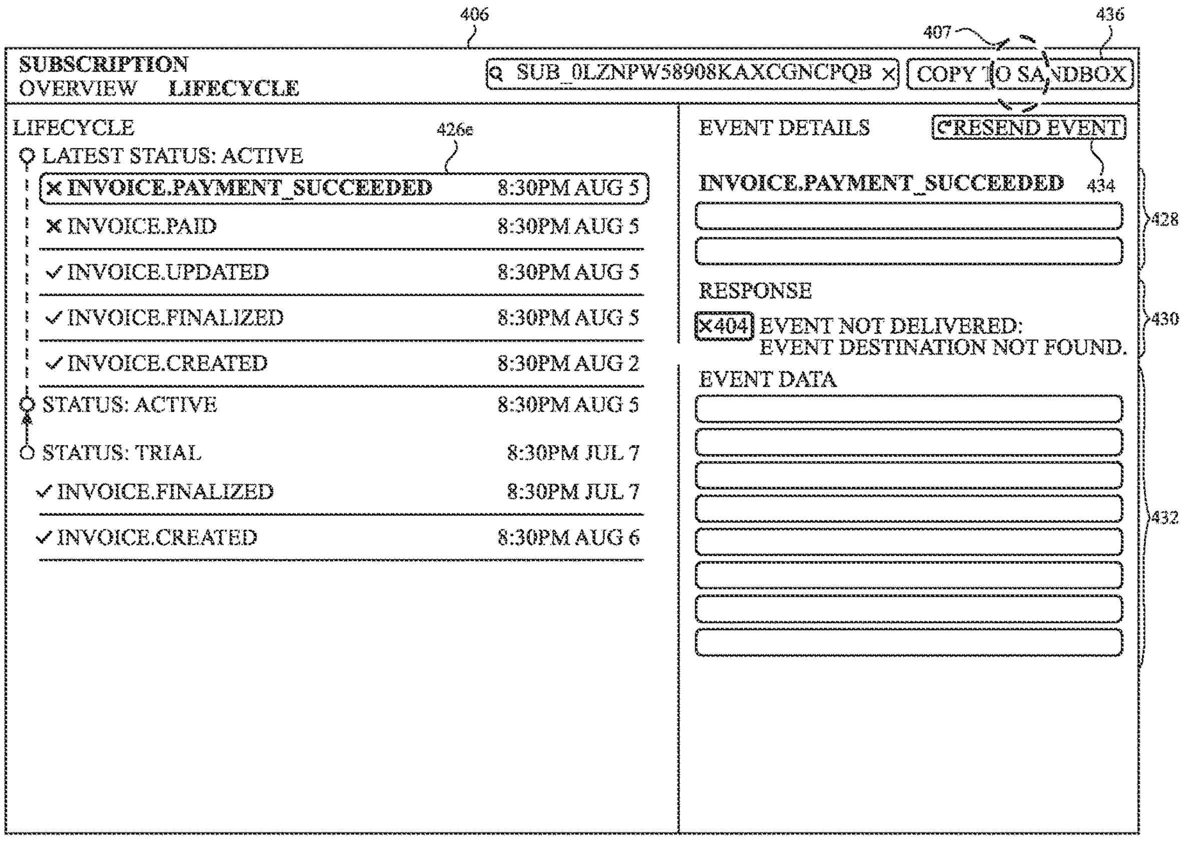

FIG. 4C illustrates inspector 406 while viewing additional information with respect to an event. In some examples, inspector 406 of FIG. 4C is displayed in response to selection of invoice payment succeeded 426*e* (e.g., as illustrated in FIG. 4B).

As illustrated in FIG. 4C, inspector 406 has maintained two columns though the right column from FIG. 4B has now moved to the left column in FIG. 4C. In addition, FIG. 4C illustrates that invoice payment succeeded 426*e* is now shown as being selected (as opposed to not selected in FIG. 4B). Replacing what was previously displayed in the right column, FIG. 4C illustrates that inspector 406 now includes additional information related to the selected event. For example, the right column includes event details 428 with details about the event (e.g., a name of the event) response 430 with details about the response received with respect to the event and event data 432 with data included in the event (e.g., in the payload of the event).

As illustrated in FIG. 4C, response 430 indicates that the event received a 404 code and that the event was not delivered because the event destination was not found. In some examples, such an error can result from the event destination being moved to a different location and the administrator not updating a configuration file related to the subscription API object and/or to the event destination. To fix the error, the administrator can attempt to make a change while the event destination is in a live environment. In some examples, such changes can make sense in the live environment and the administrator can select resend 434 after the administrator believes that the error is fixed. Selecting resend 434 causes the selected event to be re-sent to, for example, see whether the selected event is still unsuccessfully delivered and if so, why it was unsuccessfully delivered. In some examples, inspector 406 is updated after and/or in response to the resending completing (either successfully or unsuccessfully) without additional user input.

In some situations, the administrator might not want to modify configurations and/or settings in a live environment. In such situations, inspector 406 includes copy 436 to cause, when selected, a process to be initiated to copy the selected subscription API object and its dependencies into a sandbox (e.g., in a test environment). FIG. 4C illustrates tap 407 directed to copy 436.

Figure 4D:
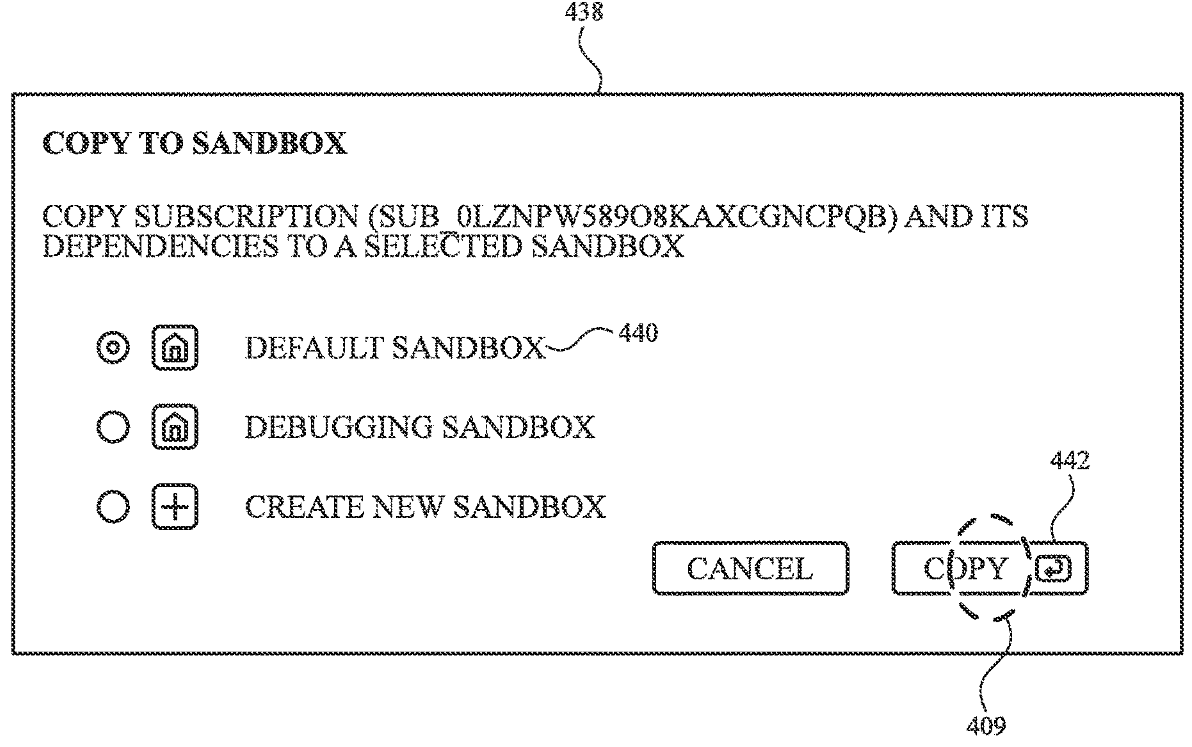

FIG. 4D illustrates pop-up 438 for copying the selected subscription API object and its dependencies into a sandbox. In some examples, pop-up 438 is displayed in response to selection of copy 436 (e.g., as illustrated in FIG. 4C). In other examples, FIG. 4E is displayed in response to selection of copy 436 and the selected subscription API object and its dependencies are automatically copied to a particular sandbox (e.g., a new sandbox or a predefined sandbox). As illustrated, pop-up 438 allows for the administrator to select between different sandboxes. In FIG. 4D, the administrator has selected default sandbox 440 and has selected copy 442 (e.g., via tap 409). In some examples, selected of copy 442 causes the selected subscription API object and its dependencies to be copied into the selected sandbox.

FIG. 4E illustrates inspector 406 with a similar appearance to inspector 406 in FIG. 4C, with the difference that copy 436 is no longer displayed. In some examples, inspector 406 is displayed in response to selection of copy 436 (as illustrated in FIG. 4C). In other examples, inspector 406 is displayed in response to selection of copy 442 (as illustrated in FIG. 4D).

In some examples, inspector 406 is displayed after and/or while the selected subscription API object and its dependencies are copied into the selected sandbox. At FIG. 4E, the administrator selects resend 434. Selecting resend 434 causes the selected event to be re-sent to, for example, see whether the selected event is still unsuccessfully delivered and if so, why it was unsuccessfully delivered. In some examples, inspector 406 is updated after and/or in response to the resending completing (either successfully or unsuccessfully) without additional user input.

Figure 4F:
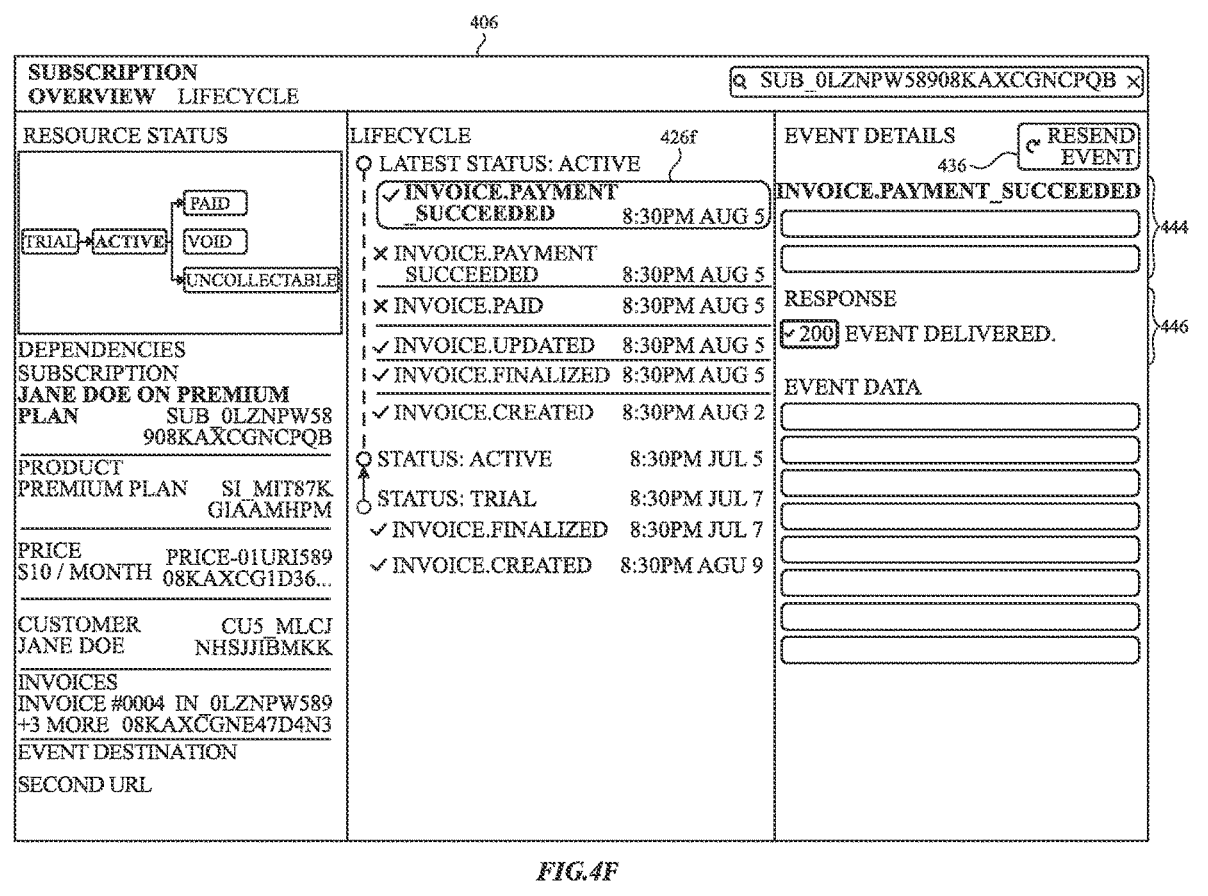

FIG. 4F illustrates inspector 406 with three columns: the left column the same as the left column of inspector 406 from FIG. 4B, the middle column similar to the right column of FIG. 4B, and the right column similar to the right column of FIG. 4C. In some examples, inspector 406 of FIG. 4F is displayed after resending invoice payment succeeded 426*e*. It should also be recognized that aspects (e.g., the three columns) of inspector 406 in FIG. 4F can be included in inspector 406 of FIGS. 4B, 4C, and/or 4E.

As illustrated in FIG. 4F, the middle column of inspector 406 has been updated to reflect that an event has occurred with respect to the subscription API object for Jane Doe. In particular, invoice payment succeeded 426*f* has been added to the middle column with an indication that it was successful, to reflect that the fix done by the administrator was successful. In addition to updating the middle column, the right column of inspector 406 in FIG. 4F has been updated to reflect that the event was successful (e.g., response 430 indicates that the event received a 200 code and that the event was delivered. In some examples, inspector 406 (as illustrated in FIGS. 4B, 4C, 4E, and/or 4F) is updated in real time as states change and/or events are received and/or sent. In such examples, the administrator is not required to refresh inspector 406 and instead can see updates occur as they happen.

FIG. 5 is a flow diagram illustrating a method (e.g., method 500) for inspecting remote resources in accordance with one or more examples described herein. Some operations in method 500 are, optionally, combined, the orders of some operations are, optionally, changed, and some operations are, optionally, omitted.

As described below, method 500 can provide an intuitive way for inspecting a remote resource. In some examples, method 500 reduces the cognitive burden on a user for inspecting a remote resource, thereby creating a more efficient human-machine interface. For battery-operated computing devices, enabling a user to inspect a remote resource faster and more efficiently conserves power and increases the time between battery charges.

In some examples, method 500 is performed by a computer system (e.g., a user device, such as a smartphone, laptop, or desktop computer). In some examples, the computer system is in communication with an input device for receiving and/or detecting user input. In some examples, the computer system is in communication with a display for displaying content.

At 502, the computer system displays (e.g., via the display) a first user interface (e.g., 400) including a representation (e.g., graphical and/or alphanumerical representation) (e.g., 402) of a remote resource (e.g., an API object, a variable, and/or a set of one or more states) (e.g., a subscription or a payment intent for a particular user) (e.g., an API object accessed via an API endpoint), wherein the representation of the remote resource includes an indication (e.g., graphical and/or alphanumerical indication) of a current state (e.g., a current value, a current mode, a most-recent operation performed, and/or a current setting) (e.g., "Active" in 402) of the remote resource. Examples of states of a subscription include trail, active, paid, void, and uncollectable. In some examples, the representation of the relationship is determined based on a document indicating multiple states and the relationship for a general remote resource, where the document originates from a party hosting the first and second user interface or a different party (e.g., a third party that defines states for the general resource of the third party and provides the states to the party hosting the first and second user interfaces).

At 504, while displaying the first user interface including the representation of the remote resource, the computer system receives (e.g., detects) (e.g., via the input device) user input (e.g., a mouse click, a tap on a touch-sensitive surface or, in some examples, a different type of input, such as a sliding input, a dragging input, and/or a swiping input) (e.g., 401) corresponding to a request to inspect the remote resource.

At 506, in response to receiving the user input, the computer system displays (e.g., via the display) a second user interface (e.g., 406) including display of (1) a representation of the current state of the remote resource (e.g., 412 and/or 426), (2) a representation of a second state of the remote resource (e.g., 410, 414, 416, 416, 422, and/or 424), and (3) a representation of a relationship (e.g., a dependency, a transition, a link, a flow, and/or a direction that the remote resource changes from the current state to the second state) (e.g., line between 410 and 412, line between 412 and 414, line between 412 and 418, and/or line between 424 and 426) between the current state and the second state, wherein the second state is different from the current state. In some examples, the computer system ceases displaying the first user interface in response to receiving the user input. In some examples, the computer system concurrently displays the first user interface and the second user interface.

In some examples, the remote resource is accessed via an Application Programming Interface (API). In some examples, the API is represented by a uniform resource indicator (URI) (e.g., a uniform resource locator (URL)) that is used to access the remote resource. In some examples, the current state of the remote resource is retrieved by sending, to a second computer system different from the computer system via an API, a request for the current state of the remote resource.

In some examples, while displaying the second user interface including display of the representation of the second state of the remote resource, the computer system detects second user input (e.g., user input selecting 410, 414, 416, and/or 418) corresponding to the representation of the second state of the remote resource. In some examples, in response to detecting the second user input corresponding to the representation of the second state of the remote resource, the computer system sends, to the second computer system via an API, a request to change the remote resource to the second state (e.g., from the current state).

In some examples, in response to detecting the second user input corresponding to the representation of the second state of the remote resource, the computer system updates the second user interface to include display of representations (e.g., 422*a*, 422*b*, and/or 426*a*-426*e*) of one or more events (e.g., a message sent and/or received, a determination made, an operation performed, and/or an update to a variable) that occurred with respect to the remote resource. In some examples, the one or more events correspond to one or more operations performed to change the remote resource from the current state to the second state.

In some examples, displaying the second user interface includes display of a representation of a third state (e.g., 410, 414, 416, 416, 422, and/or 424) different from the second state and the current state. In some examples, displaying the second user interface includes display of a representation of a relationship between the current state and the third state (e.g., line between 410 and 412, line between 412 and 414, line between 412 and 418, line between 422 and 424, and/or line between 424 and 426).

In some examples, displaying the second user interface includes display of a representation of a first set of one or more past (e.g., previous) events that occurred with respect to the remote resource (e.g., 426*a*-426*e*). In some examples, the first set of one or more past events is associated with (e.g., corresponds to, is part of, and/or occurred while the remote resource was in) the current state. In some examples, displaying the second user interface includes display of a representation of a second set of one or more past events that occurred with respect to the remote resource (e.g., 422*a*-422*b*). In some examples, the second set of one or more past events is not associated with (e.g., does not correspond to, is not part of, and/or occurred while the remote resource was in a different state than) the current state. In some examples, the second set of one or more past events are associated with the second state. In some examples, the second set of one or more past events are associated with a third state different from the current state and the second state. In some examples, the second set of one or more past events is different from the first set of one or more past events. In some examples, the first set of one or more past events is visually grouped to be associated with the current state. In some examples, the second set of one or more past events is visually grouped to be associated with a fourth state (e.g., the second state or a state different from the current state and the second state).

In some examples, a past event of the first set of one or more past events corresponds to a communication related to the remote resource. In some examples, the past event includes an indication of whether the communication was successful (e.g., the checkmark and/or "X" in 420).

In some examples, displaying the second user interface includes display of a user-interface element (e.g., 434) configured to, when selected, resend (and/or re-perform) a past event associated with the remote resource.

In some examples, the past event includes a delivery destination type. In some examples, the delivery destination type is selected from the group of HTTP webhook endpoint, remote service, and bi-directional protocol. In some examples, the past event is produced as result of the creation of an event destination (e.g., an abstraction for what to do and/or where to send information related to an event that occurs). In some examples, the event destination is unversioned. In some examples, the event destination is programmatically created and/or configured by a user. In some examples the event destination is configured by a user via an API. For example, the user can create and or edit the event destination with a remote system via the API, the event destination causing the remote system to send a message when an event occurs (e.g., an instance of the remote system sending a message when an event occurs being the past event). In some examples, the event destination is pinned to a region such that events that occur in a particular region are sent to a location (e.g., a computer system) corresponding to the particular region (e.g., events that occur in a different region are sent to a location corresponding to the different region). In some examples, the event destination includes inheritance of another event destination such that one or more configurations corresponding to the other event destination are added to the event destination without a user needing to specify the one or more configurations for the event destination (referred to as inheritance). In some examples, inheritance does not apply between different computing environments, such as between test and live environments and/or between a sandbox environment and a non-sandbox environment.

In some examples, displaying the second user interface includes display of a user-interface element (e.g., 436 or 442) configured to, when selected, initiate a process to copy the remote resource to a sandbox environment (e.g., an isolated environment that includes one or more restrictions for operation, such as a restriction for communicating outside of the isolated environment). In some examples, the process to copy the remote resource to the sandbox environment includes displaying a third user interface (e.g., 438) with (1) an indication (e.g., 440) of the sandbox environment (and optionally one or more sandbox environments) and (2) a user-interface element (e.g., 442) configured to, when selected, copy the remote resource to the sandbox environment. In some examples, initiating the process to copy the remote resource to the sandbox environment includes copying the remote resource to the sandbox environment, such that a different user interface (e.g., the third user interface) is not displayed.

Figure 6:
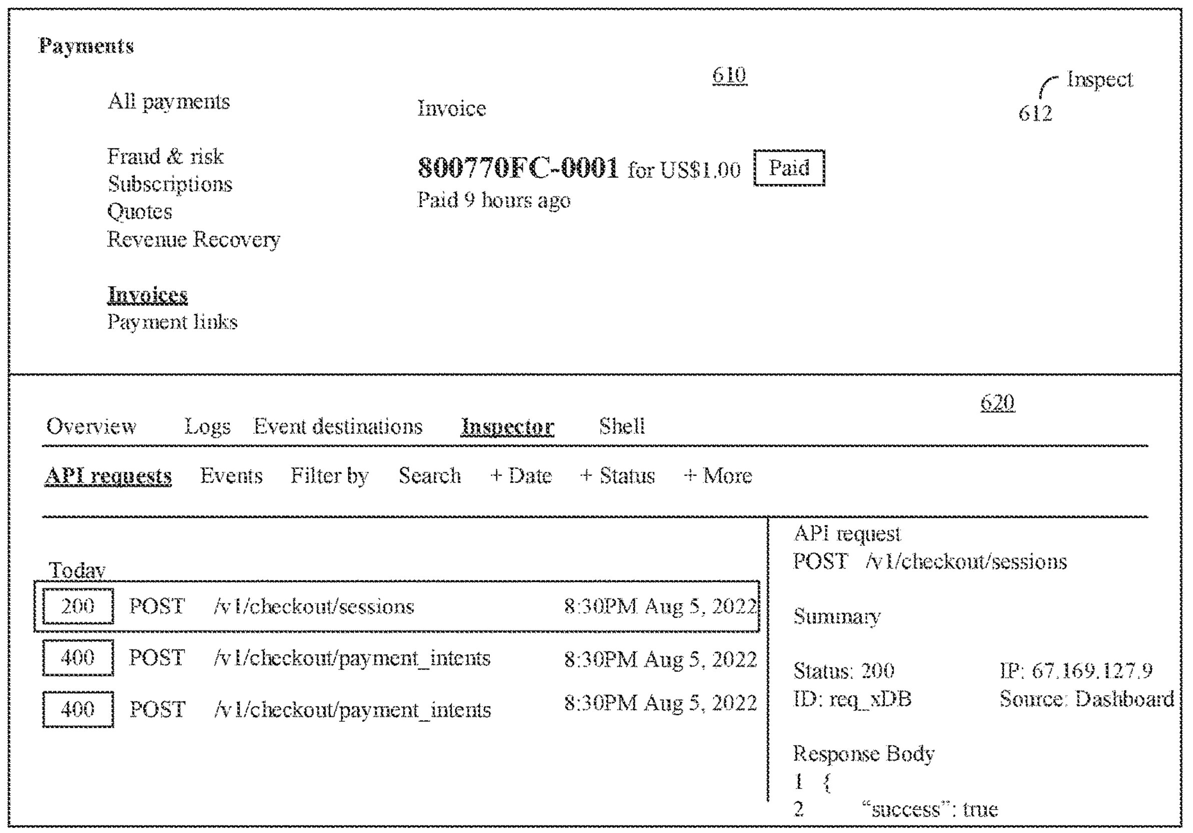
FIG. 6 is a set of exemplary user interfaces for a contextually-aware tool in accordance with one or more examples described herein.

FIG. 6 is a set of exemplary user interfaces for a contextually-aware tool in accordance with one or more examples described herein. As illustrated in FIG. 6, the set of exemplary user interfaces include client user interface 610 and development user interface 620. In some examples, client user interface 610 and/or development user interface 620 are provided by one or more platforms. For example, both client user interface 610 and development user interface 620 can be provided by the same platform or different platforms. In other examples, a platform can provide content displayed in client user interface 610 and/or development user interface 620.

The example illustrated in FIG. 6 can be a result of a user wanting additional information about a particular invoice. In particular, a user can navigate a dashboard (e.g., client user interface 610) of a platform to find the particular invoice. Once the particular invoice is found, rather than needing to explicitly send a request via an API to obtain additional information about the particular invoice, the user can cause development user interface 620 to be displayed to provide the additional information (and/or allowing the user to navigate development user interface 620 to display different information). In such an example, the user can then navigate the dashboard to a different invoice and/or a different page corresponding to a different API object managed by the platform. By navigating the dashboard, development user interface 620 can continue to be displayed while updating to reflect whatever is being displayed by the dashboard (e.g., information corresponding to the different invoice and/or the different API object such as a subscription). Such features can allow the user to (1) build and/or debug their integration with the platform and (2) identify what is happening and/or happened with respect to the platform.

In some examples, client user interface 610 is an interface with information provided by a server (e.g., server 220) of a platform. In some examples, the interface includes information corresponding to remote resources stored and/or managed by the server and/or the platform, such as API objects, state machines, configurations, settings, and/or API resources. As illustrated in FIG. 6, client user interface 610 corresponds to an invoice and includes display of an identifier of the invoice (e.g., "800770FC-0001"), an amount of the invoice (e.g., "US$1.00"), that the invoice was paid (e.g., "Paid"), and when the invoice was paid (e.g., "Paid 9 hours ago"). In some examples, the invoice is an API object of the server and/or the platform, and the information about the invoice is included in client user interface 610 by communicating with the server and/or the platform. For example, a computer system displaying client user interface 610 can retrieve information corresponding to the invoice using an API and then display the information in client user interface 610. It should be recognized that, in some examples, client user interface 610 can appear different, such as including more, less, and/or different information. Another example of client user interface 610 is dashboard 400 in FIG. 4A.

In some examples, client user interface 610 can be updated as a user navigates client user interface 610. For example, input can be detected corresponding to "Payment links", "Quotes", and/or "All payments" to update client user interface 610 to display corresponding information. In such an example, the input causes a communication to be sent to the server to retrieve the corresponding information.

In some examples, input directed to client user interface 610 can cause one or more operations to be performed by the server, such as input corresponding to a request to create a new invoice or add a new customer. In such examples, a new API object corresponding to the new invoice or the new customer is created in the server and/or the platform.

As illustrated in FIG. 6, client user interface 610 includes inspect control 612. In some examples, inspect control 612 is a user interface element that is selectable (e.g., via user input) to cause display of development user interface 620, as described further below. It should be recognized that, in some examples, client user interface 610 does not include inspect control 612 and/or includes functionality to display development user interface 620 in a different form.

In some examples, development user interface 620 is an interface with information provided by a server (e.g., server 220) of a platform, such as the server and/or the platform that provided information included in client user interface 620. As illustrated in FIG. 6, development user interface 620 is displayed concurrently with client user interface 610, such that at least a portion of each is visible to a user. In some examples, development user interface 620 is a free floating, minimizable user interface affixed to the bottom of a browser also displaying client user interface 610. It should be recognized that more or less of each interface can be displayed, such as less of client user interface 610 can be displayed while more of development user interface 620 is displayed. In some examples, development user interface 620 can be different sizes depending on what information is included in and/or how a user has configured development user interface 620. In such examples, development user interface 620 can be expanded, shrunk, and/or minimized to display more or less information corresponding to client user interface 610.

As illustrated in FIG. 6, development user interface 620 includes a list of different API requests that were received (e.g., by the server and/or the platform) with respect to the invoice in client user interface 610. The list of different API requests can be retrieved via an API request to the server managing the invoice. It should be recognized that development user interface 620 can include other information, such as how many API requests were received, how many API requests failed, and/or how many events occurred with respect to the invoice. Other examples of information and/or functionality that can be included in development user interface 620 include are illustrated in FIGS. 3E, 4B, 4C, 4E, and/or 4F and/or described above. For example, information in 304 354, and/or 356 of FIG. 3E can be integrated and/or included in development user interface 620, such as when client user interface 610 is displaying corresponding information. For another example, development user interface 620 can include an identification of a current state of an API object, other possible states of the API object, and/or events that occurred with respect to the API object. For another example, development user interface 620 can include information with respect to display characteristics of client user interface 610. For example, development user interface 620 can include an identification of a color used in display of client user interface 610 (e.g., where client user interface 610 does not include the identification of the color). In such an example, development user interface 620 can be used to change the color, populate user-interface elements (e.g., automatically adding test data to a form) and/or add a new user-interface element (e.g., a new field and/or button) by sending a request to the platform managing the client user interface 610.

In some examples, the above description is not editing content stored on a computer system displaying client user interface 610 and/or development user interface 620 but rather obtaining information and editing data on another computer system remote from the computer system. For example, development user interface 620 can be used to configure an API platform (1) separate from a web server providing development user interface 620 and (2) separate from the computer system displaying development user interface 620. Traditionally, such information with respect to the API platform is hidden from a user and/or requires several manual steps for the user to obtain (e.g., sending a request via an API to an API endpoint that provides a response with sometimes just a part of the information needed). Such techniques as described above can allow for the user to see what is happening inside of the API platform.

Figure 7:
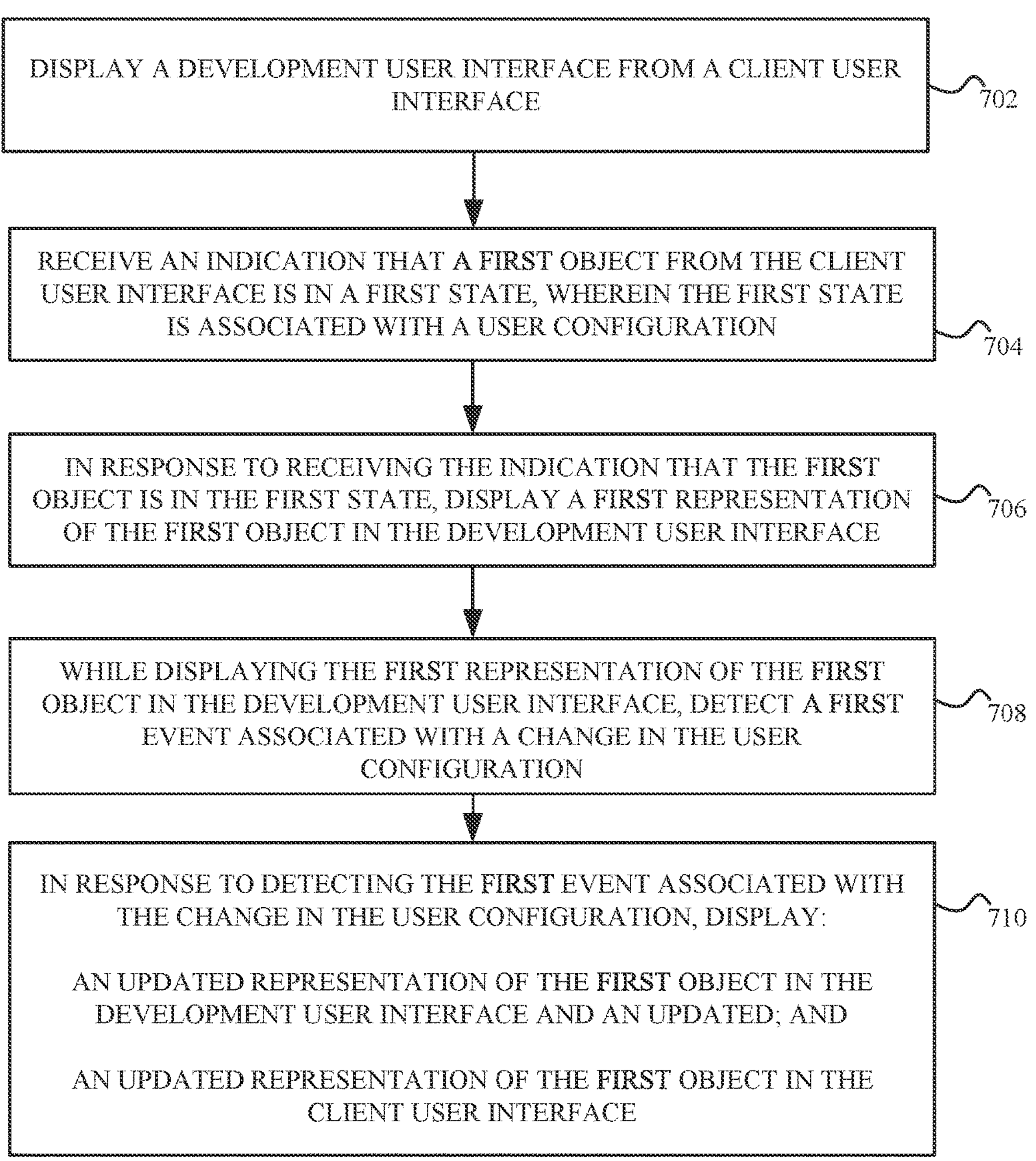
FIG. 7 is a flow diagram illustrating a method for providing a contextually-aware tool in accordance with one or more examples described herein.

FIG. 7 is a flow diagram illustrating a method (e.g., method 700) for providing a contextually-aware tool in accordance with one or more examples described herein. Some operations in method 700 are, optionally, combined, the orders of some operations are, optionally, changed, and some operations are, optionally, omitted.

As described below, method 700 can provide an intuitive way to interact with a platform (e.g., an API platform). In some examples, method 500 reduces the cognitive burden on a user for interacting with the platform, thereby creating a more efficient human-machine interface.

In some examples, method 700 is performed by a computer system (e.g., a user device, such as a smartphone, laptop, or desktop computer). In some examples, the computer system is in communication with an input device for receiving and/or detecting user input. In some examples, the computer system is in communication with a display for displaying content.

At 702, the computer system displays (e.g., via the display) a development user interface (e.g., 620) from a client user interface (e.g., 610). In some examples, the development user interface is displayed in response to detecting user input (e.g., via the input device) directed to the client user interface (e.g., user input directed to inspect control 612). In some examples, the development user interface includes display of representations of one or more objects associated with the client user interface. In such examples, the client user interface can also include display of representations of the one or more objects. Such one or more objects can be stored and/or managed by a remote platform (e.g., an API platform). In some examples, the representations are provided to the computer system by the remote platform, such as in response to a request by the computer system to display the development user interface and/or the client user interface.

At 704, the computer system receives an indication that a first object of the one or more objects from the client user interface is in a first state (e.g., that the invoice is paid in FIG. 6). In some examples, the first state is associated with a user configuration. In some examples, the user configuration corresponds to a configuration of the first object, such as to include the first state and/or to cause the first object to transition into the first state. In some examples, the first object is an API object. In some examples, information associated with the API object is received via an API (e.g., from the remote platform). In some examples, the first object is associated with a state machine, a configuration object for changing the state machine, or a log of an event that occurred. In some examples, the object is associated with a preference or a configuration of the client user interface. In some examples, the API object is stored by the remote platform (e.g., the API platform).

At 706, in response to receiving the indication that the first object is in the first state, the computer system displays a first representation (e.g., as illustrated in 620 in FIG. 6) of the first object in the development user interface. In some examples, the first representation of the first object indicates the first object is in the first state. In some examples, the first representation of the first object in the development user interface is not displayed in the client user interface. For example, as illustrated in FIG. 6, the first representation of the first object in the development user interface can include that a POST operation was unsuccessfully performed two separate times (e.g., indicated by "400") and successfully performed one time (e.g., indicated by "200"). In some examples, the development user interface does not include the representation that the POST operation was successful when initially displayed. In such examples, the development user interface is updated to include the representation that the POST operation was successful when the computer system received the indication that such was performed. In some examples, before updating the development user interface, the development user interface can indicate that the invoice was not paid as a result of the POST operation being unsuccessful.

At 708, while displaying the first representation of the first object in the development user interface, the computer system detects a first event associated with a change in the user configuration. In some examples, the first event indicates the first object has transitioned to a second state different from the first state. In some examples, the first event is detected or the indication is received via an Application Programming Interface (API). In some examples, detecting the first event associated with the change in the user configuration includes receiving, from a server, an indication of the first event associated with the change in the user configuration.

At 710, in response to detecting the first event associated with the change in the user configuration, the computer system displays (1) an updated representation of the first object in the development user interface and (2) an updated representation of the first object in the client user interface. In some examples, the development user interface did not include a representation that the POST operation was successful when displayed at 706. In such examples, the development user interface is updated to include the representation that the POST operation was successful when the computer system received the indication that such was performed (e.g., the first event that occurred in 708 is that the POST operation was successful). In some examples, before updating the development user interface, the development user interface can indicate that the invoice was not paid as a result of the POST operation being unsuccessful.

In some examples, the computer system detects a second event associated with the client user interface. For example, the second event can correspond to a user requesting that the client user interface display different information. In some examples, the second event causes display of a third representation of a second object (e.g., a different invoice than depicted in FIG. 6 or a subscription as depicted in FIG. 4A) in the client user interface. In some examples, the second object is different from the first object. In some examples, in response to detecting the second event, the computer system displays a third representation of the second object in the development user interface (e.g., as depicted in FIG. 4B).

In some examples, while displaying the first representation of the first object in the development user interface, the computer system displays a second representation of the first object. In some examples, the second representation of the first object indicates that the first object is able to transition to a third state different from the first state.

In some examples, while displaying the second representation of the first object, the computer system detects first user input corresponding to the second representation of the first object. In some examples, in response to detecting the first user input corresponding to the second representation, the computer system sends a request to change a state of the first object to the third state.

In some examples, while displaying the first representation of the first object in the development user interface, the computer system displays (1) one or more representations of a first set of past events corresponding to the first state and (2) one or more representations of a second set of past events corresponding to the third state. In some examples, the second set of past events are different from the first set of past events. In some examples, while displaying the one or more representations of the first set of past events corresponding to the first state, the computer system displays a user-interface element. In some examples, while displaying the user-interface element, the computer system detects a second user input corresponding to the user-interface element. In some examples, in response to detecting the second user input corresponding to the user-interface element, the computer system sends a request to perform an event of the first set of past events.

In some examples, the computer system receives an indication that a third object (e.g., different from the first object and/or the second object) is in a respective state (e.g., different from the first state, the second state, and/or the third state described above). For example, the third object can be a subscription object that is managed by the remote platform described above. In such an example, the subscription object can be accessed by the computer system via an API and, in some examples, a representation of the subscription object (e.g., whether it is currently valid) can be displayed in the client user interface and/or the development user interface. In some examples, the indication that the third object is in the respective state is received while the computer system is displaying or not displaying a representation corresponding to the third object (e.g., in the client user interface and/or the development user interface). In some examples, the respective state (e.g., a current state and/or a previous state of the third object) is not reflected in the client user interface. For example, the respective state can correspond to a first set of data of the third object (e.g., whether the computer system is currently valid) that is not reflected in the client user interface while a second set of data (e.g., different from the first set of data) of the third object (e.g., an identifier of the subscription object) is reflected in the client user interface. For another example, no data corresponding to the third object is reflected in the client user interface. In some examples, a respective representation of the third object is not included and/or displayed in the client user interface. In some examples, a respective representation of the third object is only displayed in the development user interface. In some examples, the third object is not exposed in the client user interface. In some examples, information related to the third object can be accessed (e.g., and, in some examples, only accessed) via an API with one or more remote platforms (e.g., the remote platform described above and/or a separate remote platform). In some examples, in response to receiving the indication that the third object is in the respective state, the computer system displays a third representation (e.g., the respective representation or a different representation) of the third object in the development user interface (e.g., that the subscription object is currently valid). In some examples, the third representation of the third object indicates that the third object is in the respective state. In some examples, the third representation is displayed in the development user interface while the computer system is not displaying a representation corresponding to the third object in the client user interface. In some examples, the third representation is displayed in the development user interface while the computer system is displaying (1) the first representation of the first object in the development user interface, (2) the updated representation of the first object in the client user interface, (3) the updated representation of the first object in the development user interface, and/or (4) a respective representation of a respective object different from the first object in the client user interface and/or the development user interface.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described to best explain the principles and practical applications of the various embodiments, to thereby enable others skilled in the art to best utilize the various embodiments with various modifications as may be suited to the particular use contemplated.

What is claimed is:

1. A method, comprising:

by a computer system:

displaying a development user interface from a client user interface, wherein the development user interface displays representations of one or more objects associated with the client user interface;

receiving an indication that a first object of the one or more objects from the client user interface is in a first state, wherein the first state is associated with a user configuration;

in response to receiving the indication that the first object is in the first state, displaying a first representation of the first object in the development user interface, wherein the first representation of the first object indicates the first object is in the first state;

while displaying the first representation of the first object in the development user interface, detecting a first event associated with a change in the user configuration, wherein the first event indicates the first object has transitioned to a second state different from the first state; and in response to detecting the first event associated with the change in the user configuration, displaying:

an updated representation of the first object in the development user interface; and an updated representation of the first object in the client user interface, wherein the development user interface is displayed concurrently with the client user interface, and wherein the updated representations in both the development user interface and the client user interface are automatically displayed based on a same detected first event without requiring navigation or manual refresh of the client user interface.

2. The method of claim 1, wherein the first event is detected or the indication is received via an Application Programming Interface (API).

3. The method of claim 1, wherein detecting the first event associated with the change in the user configuration includes receiving, from a server, an indication of the first event associated with the change in the user configuration.

4. The method of claim 1, wherein the first object is an API object, and wherein information associated with the API object is received via an API.

5. The method of claim 1, wherein the first object is associated with a state machine, a configuration object for changing the state machine, or a log of an event that occurred.

6. The method of claim 1, wherein the first object is associated with a preference or a configuration of the client user interface.

7. The method of claim 1, further comprising:

while displaying the first representation of the first object in the development user interface, displaying:

one or more representations of a first set of past events corresponding to the first state; and one or more representations of a second set of past events corresponding to a third state, wherein the second set of past events are different from the first set of past events.

8. The method of claim 7, further comprising:

while displaying the one or more representations of the first set of past events corresponding to the first state, displaying a user-interface element;

while displaying the user-interface element, detecting a second user input corresponding to the user-interface element; and in response to detecting the second user input corresponding to the user-interface element, sending a request to perform an event of the first set of past events.

9. The method of claim 1, further comprising:

detecting a second event associated with the client user interface, wherein the second event causes display of a third representation of a second object in the client user interface, and wherein the second object is different from the first object; and in response to detecting the second event, displaying a third representation of the second object in the development user interface.

10. The method of claim 1, further comprising:

receiving an indication that a third object is in a respective state, wherein a third representation of the third object and the respective state are not reflected in the client user interface; and in response to receiving the indication that the third object is in the respective state, displaying the third representation of the third object in the development user interface, wherein the third representation of the third object indicates that the third object is in the respective state.

11. The method of claim 1, wherein, responsive to navigation in the client user interface that causes display of a second object different from the first object, the development user interface automatically updates to display a representation of the second object.

12. The method of claim 1, further comprising:

displaying, in the development user interface, a user-interface element that, when activated, causes a past event previously associated with the first object to be re-executed.

13. A non-transitory computer-readable storage medium storing one or more programs configured to be executed by one or more processors of a computer system, the one or more programs including instructions configured to perform:

displaying a development user interface from a client user interface, wherein the development user interface displays representations of one or more objects associated with the client user interface;

receiving an indication that a first object of the one or more objects from the client user interface is in a first state, wherein the first state is associated with a user configuration;

in response to receiving the indication that the first object is in the first state, displaying a first representation of the first object in the development user interface, wherein the first representation of the first object indicates the first object is in the first state;

while displaying the first representation of the first object in the development user interface, detecting a first event associated with a change in the user configuration, wherein the first event indicates the first object has transitioned to a second state different from the first state; and in response to detecting the first event associated with the change in the user configuration, displaying:

an updated representation of the first object in the development user interface; and an updated representation of the first object in the client user interface, wherein the development user interface is displayed concurrently with the client user interface, and wherein the updated representations in both the development user interface and the client user interface are automatically displayed based on a same detected first event without requiring navigation or manual refresh of the client user interface.

14. The non-transitory computer-readable storage medium of claim 13, wherein the first event is detected or the indication is received via an Application Programming Interface (API).

15. The non-transitory computer-readable storage medium of claim 13, wherein detecting the first event associated with the change in the user configuration includes receiving, from a server, an indication of the first event associated with the change in the user configuration.

16. The non-transitory computer-readable storage medium of claim 13, wherein the first object is an API object, and wherein information associated with the API object is received via an API.

17. The non-transitory computer-readable storage medium of claim 13, wherein the first object is associated with a state machine, a configuration object for changing the state machine, a log of an event that occurred, or a preference or a configuration of the client user interface.

18. A computer system, comprising:

one or more processors; and a memory storing one or more programs configured to be executed by the one or more processors, the one or more programs including instructions configured to perform:

displaying a development user interface from a client user interface, wherein the development user interface displays representations of one or more objects associated with the client user interface;

receiving an indication that a first object of the one or more objects from the client user interface is in a first state, wherein the first state is associated with a user configuration;

in response to receiving the indication that the first object is in the first state, displaying a first representation of the first object in the development user interface, wherein the first representation of the first object indicates the first object is in the first state;

while displaying the first representation of the first object in the development user interface, detecting a first event associated with a change in the user configuration, wherein the first event indicates the first object has transitioned to a second state different from the first state; and in response to detecting the first event associated with the change in the user configuration, displaying:

an updated representation of the first object in the development user interface; and an updated representation of the first object in the client user interface, wherein the development user interface is displayed concurrently with the client user interface, and wherein the updated representations in both the development user interface and the client user interface are automatically displayed based on a same detected first event without requiring navigation or manual refresh of the client user interface.

19. The computer system of claim 18, wherein the first event is detected or the indication is received via an Application Programming Interface (API).

20. The computer system of claim 18, wherein detecting the first event associated with the change in the user configuration includes receiving, from a server, an indication of the first event associated with the change in the user configuration.

21. The computer system of claim 18, wherein the first object is an API object, and wherein information associated with the API object is received via an API.

* * * * *